US008967798B2

(12) United States Patent
Yamakaji

(10) Patent No.: US 8,967,798 B2
(45) Date of Patent: Mar. 3, 2015

(54) METHOD FOR EVALUATING EYEGLASS LENS, METHOD FOR DESIGNING EYEGLASS LENS, AND METHOD FOR MANUFACTURING EYEGLASS LENS

(75) Inventor: Tetsuma Yamakaji, Saitama (JP)

(73) Assignee: Hoya Corporation, Tokyo (JP)

( * ) Notice: Subject to any disclaimer, the term of this patent is extended or adjusted under 35 U.S.C. 154(b) by 588 days.

(21) Appl. No.: 13/194,015

(22) Filed: Jul. 29, 2011

(65) Prior Publication Data

US 2012/0105801 A1 May 3, 2012

Related U.S. Application Data

(63) Continuation-in-part of application No. PCT/JP2010/051266, filed on Jan. 29, 2010.

(30) Foreign Application Priority Data

Jan. 30, 2009 (JP) ................. 2009-020805

(51) Int. Cl.
  *G02C 7/02* (2006.01)
  *G01M 11/02* (2006.01)
  *G02C 7/06* (2006.01)

(52) U.S. Cl.
  CPC ............. *G01M 11/0242* (2013.01); *G02C 7/02* (2013.01); *G02C 7/025* (2013.01); *G02C 7/061* (2013.01)
  USPC .................................. 351/159.76

(58) Field of Classification Search
  USPC ............. 351/159.76, 159.73, 159.74, 159.75; 264/1.1, 1.32
  See application file for complete search history.

(56) References Cited

U.S. PATENT DOCUMENTS

| 4,606,622 A | 8/1986 | Fueter et al. |
| 4,988,182 A | 1/1991 | Takahashi et al. |

(Continued)

FOREIGN PATENT DOCUMENTS

| JP | B-42-9416 | 5/1967 |
| JP | A-1-221722 | 9/1989 |

(Continued)

OTHER PUBLICATIONS

Hoffman et al., "Vergence-accommodation conflicts hinder visual performance and cause visual fatigue," Journal of Vision, vol. 8, No. 3, 33, p. 4, Fig. 2, (2008).

(Continued)

*Primary Examiner* — James Greece
(74) *Attorney, Agent, or Firm* — Oliff PLC

(57) ABSTRACT

An optical system is configured using a coordinate system such that an origin 1 is placed at a middle point of centers of rotations 1L and 1R of both eyeballs 10L and 10R, and an object is specified in a viewing direction from the origin 1. A reference value of an angle of convergence $\theta_{CH0}$ is calculated with lines of fixations 13L0 and 13R0, a viewing direction of the lines of fixation being an object 12 which is placed at an intersection point at which the lines of fixations 13L0 and 13R0 cross after passing through design reference points 11PL and 11PR of eyeglass lenses 11L, 11R. The angle of convergence is calculated with the lines of fixations which extend to an object evaluation point in an arbitrary viewing direction and pass the eyeglass lenses, and a convergence aberration is calculated from a difference between the angle of convergence and the reference value of the angle of convergence $\theta_{CH0}$.

13 Claims, 22 Drawing Sheets

(56) References Cited

U.S. PATENT DOCUMENTS

| | | | |
|---|---|---|---|
| 6,123,422 | A | 9/2000 | Menezes et al. |
| 6,149,271 | A | 11/2000 | Menezes et al. |
| 6,222,621 | B1 | 4/2001 | Taguchi |
| 6,817,713 | B2 | 11/2004 | Ueno |
| 7,481,533 | B2 | 1/2009 | Gupta et al. |
| 2002/0118337 | A1 | 8/2002 | Perrott et al. |
| 2003/0107702 | A1 | 6/2003 | Yamakaji |
| 2004/0179168 | A1 | 9/2004 | Yamakaji |
| 2005/0004694 | A1 | 1/2005 | Ueno |
| 2005/0041205 | A1 | 2/2005 | Yamakaji |
| 2005/0179859 | A1 | 8/2005 | Perrott et al. |
| 2008/0106697 | A1 | 5/2008 | Pedrono |
| 2008/0239241 | A1 | 10/2008 | Yamakaji |
| 2011/0194067 | A1 | 8/2011 | Yamakaji |

FOREIGN PATENT DOCUMENTS

| | | | |
|---|---|---|---|
| JP | B-2-39767 | | 9/1990 |
| JP | A-2000-506628 | | 5/2000 |
| JP | A-2000-186978 | | 7/2000 |
| JP | 2007101915 A | * | 4/2007 |
| JP | A-2007-101915 | | 4/2007 |
| JP | A-2008-83729 | | 4/2008 |
| JP | A-2008-511033 | | 4/2008 |
| RU | 2 231 996 C2 | | 7/2004 |
| WO | WO/02/088828 A1 | | 11/2002 |
| WO | WO/2004/018988 A1 | | 3/2004 |
| WO | WO 2008/055031 A2 | | 5/2008 |
| WO | WO/2009/057708 A1 | | 5/2009 |

OTHER PUBLICATIONS

Schor et al., "Binocular Sensory Fusion is Limited by Spatial Resolution," Vision Research vol. 24, No. 7, pp. 661-665, (1984).

Nov. 18, 2013 Office Action issued in Russian Application No. 2011135975 (with translation).

Noguchi et al., "Active Optics Experiments. I, Shack-Hartman Wave-Front Analyzer to Measure F/5 Mirrors," Natl. Astron. Obs., Japan vol. 1, pp. 49-55 (1989).

Hoffman et al., "Vergence-Accommodation Conflicts Hinder Visual Fatigue," Journal of Vision, vol. 8, No. 3, 33, p. 4, Fig. 2, (2008).

Izumi, et al., "Examination of Binocular Function," Revised Version, Waseda Optometry College, p. 5, (1985).

Uchikawa et al., "Vision II," Asakura Publishing Co., Ltd. pp. 86, 131-132, (2007).

Osaka & Nakamizo et al., "Binocular Movement and Hearing Theory, Experimental Psychology of Eye Movement," The University of Nagoya Press, Chapter 3, pp. 60-61, (1993).

Bernard et al., "Traps in Displaying Optical Performances of a Progressive-Addition Lens," Applied Optics., vol. 31., No. 19, pp. 3586-3593, Fig., 5, (1992).

"Handbook of Visual Information Processing," Edited by The Vision Society of Japan, Asakura Publishing Co., Ltd. pp. 283-287, p. 285, Fig. 7, (2000).

Koichi Shimono, "Effects of Vergence Eye Movement and Binocular Stereopsis," Tokyo University of Mercantile Marine, vol. 23, pp. 17-22, (Jan. 1994).

Howard et al., "Binocular Vision and Stereopsis," No. 29, Chapter 2, New York, Oxford Press, pp. 39 & 56, (1995).

Mar. 30, 2010 International Search Report issued in Patent Application No. PCT/JP2010/051266 (with translation).

Japanese Office Action issued in Japanese Patent Application No. 2010-548570 on Aug. 12, 2013 (with translation).

Noguci II et al., "Active Optics Experiments. I., Shack-Hartmann Wave-Front Analyzer to Measure F/5 Mirrors," Natl. Astron, Obs., Japan vol. 1, pp. 49-55 (1989).

Izumi, et al., "Examination of Binocular Function," Revised Version, Waseda Optometry College, p. 5, (1993).

Osaka & Nakamizo et al., "Binocular Movement and Hering Theory, Experimental Psychology of Eye Movement," The University of Nagoya Press, Chapter 3, pp. 60-61, (1993).

Bourdoncle et al., "Traps in Displaying Optical Performances of a Progressive-Addition Lens," Applied Optics., vol. 31., No. 19, pp. 3586-3593, Fig., 5, (1992).

"Handbook of Visual Information Processing," Edited by the Vision Society of Japan, Asakura Publishing Co., Ltd. pp. 283-287, p. 285, Fig. 7.1, (2000).

Koichi Shimono, "Effects of Vergence Eye Movements on Binocular Stereopsis," Tokyo University of Mercantile Marine, vol. 23, pp. 17-22, (Jan. 1994).

* cited by examiner

FIG. 18
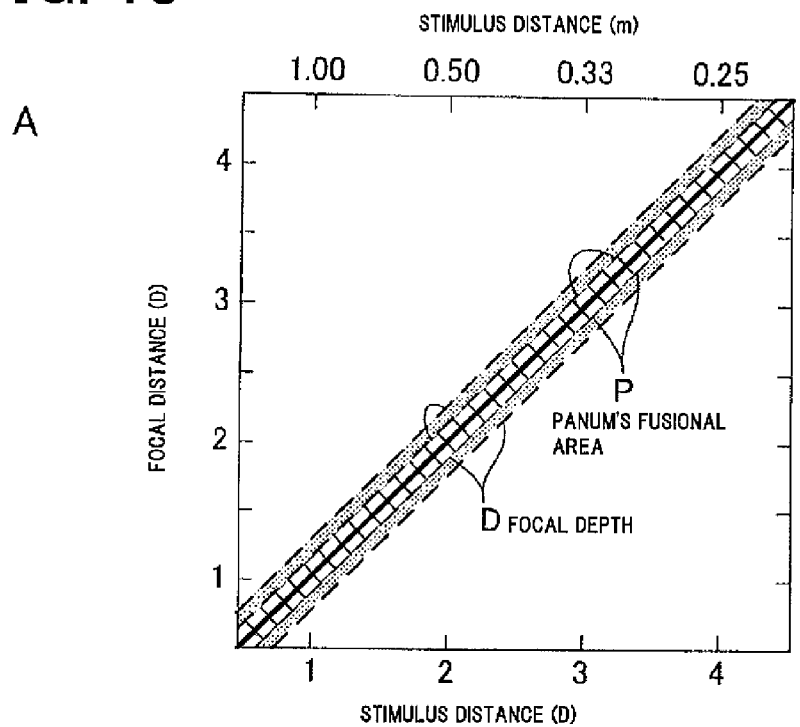
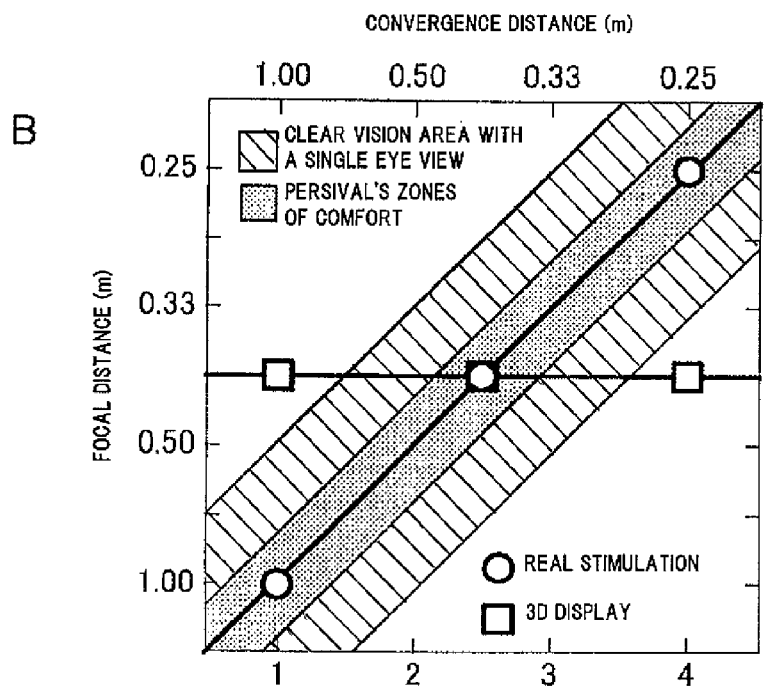

| cm | MA | arc min | Δ |
|---|---|---|---|
|  | 0 | 0.0 | 0.0 |
| 2000 | 0.05 | 10.3 | 0.3 |
| 1000 | 0.1 | 20.6 | 0.6 |
| 667 | 0.15 | 30.9 | 0.9 |
| 500 | 0.2 | 41.3 | 1.2 |
| 400 | 0.25 | 51.6 | 1.5 |
| 333 | 0.3 | 61.9 | 1.8 |
| 286 | 0.35 | 72.2 | 2.1 |
| 250 | 0.4 | 82.5 | 2.4 |
| 222 | 0.45 | 92.8 | 2.7 |
| 200 | 0.5 | 103.1 | 3.0 |
| 182 | 0.55 | 113.4 | 3.3 |
| 167 | 0.6 | 123.7 | 3.6 |
| 154 | 0.65 | 134.0 | 3.9 |
| 143 | 0.7 | 144.3 | 4.2 |
| 133 | 0.75 | 154.6 | 4.5 |
| 125 | 0.8 | 164.9 | 4.8 |
| 118 | 0.85 | 175.2 | 5.1 |
| 111 | 0.9 | 185.5 | 5.4 |
| 105 | 0.95 | 195.7 | 5.7 |
| 100 | 1 | 206.0 | 6.0 |
| 95 | 1.05 | 216.3 | 6.3 |
| 91 | 1.1 | 226.6 | 6.6 |
| 87 | 1.15 | 236.8 | 6.9 |
| 83 | 1.2 | 247.1 | 7.2 |
| 80 | 1.25 | 257.3 | 7.5 |
| 77 | 1.3 | 267.6 | 7.8 |
| 74 | 1.35 | 277.9 | 8.1 |
| 71 | 1.4 | 288.1 | 8.4 |
| 69 | 1.45 | 298.3 | 8.7 |
| 67 | 1.5 | 308.6 | 9.0 |
| 65 | 1.55 | 318.8 | 9.3 |
| 63 | 1.6 | 329.0 | 9.6 |
| 61 | 1.65 | 339.2 | 9.9 |
| 59 | 1.7 | 349.4 | 10.2 |
| 57 | 1.75 | 359.6 | 10.5 |
| 56 | 1.8 | 369.8 | 10.8 |
| 54 | 1.85 | 380.0 | 11.1 |
| 53 | 1.9 | 390.2 | 11.4 |
| 51 | 1.95 | 400.4 | 11.7 |
| 50 | 2 | 410.6 | 12.0 |

B

(PD=0.065)

| cm | MA | arc min | Δ |
|---|---|---|---|
|  | 0 | 0.0 | 0.0 |
| 2000 | 0.05 | 11.2 | 0.3 |
| 1000 | 0.1 | 22.3 | 0.7 |
| 667 | 0.15 | 33.5 | 1.0 |
| 500 | 0.2 | 44.7 | 1.3 |
| 400 | 0.25 | 55.9 | 1.6 |
| 333 | 0.3 | 67.0 | 2.0 |
| 286 | 0.35 | 78.2 | 2.3 |
| 250 | 0.4 | 89.4 | 2.6 |
| 222 | 0.45 | 100.5 | 2.9 |
| 200 | 0.5 | 111.7 | 3.3 |
| 182 | 0.55 | 122.8 | 3.6 |
| 167 | 0.6 | 134.0 | 3.9 |
| 154 | 0.65 | 145.2 | 4.2 |
| 143 | 0.7 | 156.3 | 4.6 |
| 133 | 0.75 | 167.5 | 4.9 |
| 125 | 0.8 | 178.6 | 5.2 |
| 118 | 0.85 | 189.7 | 5.5 |
| 111 | 0.9 | 200.9 | 5.9 |
| 105 | 0.95 | 212.0 | 6.2 |
| 100 | 1 | 223.1 | 6.5 |
| 95 | 1.05 | 234.3 | 6.8 |
| 91 | 1.1 | 245.4 | 7.2 |
| 87 | 1.15 | 256.5 | 7.5 |
| 83 | 1.2 | 267.6 | 7.8 |
| 80 | 1.25 | 278.7 | 8.1 |
| 77 | 1.3 | 289.8 | 8.5 |
| 74 | 1.35 | 300.9 | 8.8 |
| 71 | 1.4 | 312.0 | 9.1 |
| 69 | 1.45 | 323.1 | 9.4 |
| 67 | 1.5 | 334.1 | 9.8 |
| 65 | 1.55 | 345.2 | 10.1 |
| 63 | 1.6 | 356.2 | 10.4 |
| 61 | 1.65 | 367.3 | 10.7 |
| 59 | 1.7 | 378.3 | 11.1 |
| 57 | 1.75 | 389.4 | 11.4 |
| 56 | 1.8 | 400.4 | 11.7 |
| 54 | 1.85 | 411.4 | 12.0 |
| 53 | 1.9 | 422.4 | 12.4 |
| 51 | 1.95 | 433.4 | 12.7 |
| 50 | 2 | 444.4 | 13.0 |

Sph   0dpt
Add + 2dpt
⌀ 60mm

METHOD FOR EVALUATING EYEGLASS LENS, METHOD FOR DESIGNING EYEGLASS LENS, AND METHOD FOR MANUFACTURING EYEGLASS LENS

This is a Continuation-in-Part of International Application No. PCT/JP2010/051266 filed Jan. 29, 2010, which claims priority from Japanese Patent Application No, 2009-020805 filed Jan. 30, 2009. The entire disclosure of the prior application is hereby incorporated by reference herein its entirety.

TECHNICAL FIELD

The present invention relates to a method of evaluating eyeglass lenses, the method being used for evaluating performance when the eyeglass lenses are designed or produced, and to a method of designing eyeglass lenses and a method of manufacturing eyeglass lenses using it.

BACKGROUND

For evaluating or designing eyeglass lenses, various evaluation methods and designing methods are proposed to obtain the optimal visibility, and especially a technique is proposed which is focusing on eyesight in a state in which glass lenses are worn. It is referenced, for example, in patent document 1 (Japanese Published Examined Application No. HEI02-39767B (Japanese Patent Provisional Publication No. SHO57-10113A)), patent document 2 (Japanese Unexamined Patent Application Publication (Translation of PCT Application) No. 2008-511033A), and patent document 3 (Japanese Unexamined Patent Application Publication (Translation of PCT Application) No. 2000-506628A), that how it can be seen by left and right eyes when a pair of eyeglasses are worn. Further, as references, in patent document 4 (Japanese Patent Provisional Publication No. HEI01-221722A), non-patent document 9 (Bernard et al. Traps in displaying optical performances of a progressive-addition lens," APPLIED OPTIC, Vol. 31, No. 19, (1992), p. 3586-3593), and non-patent document 10 ("Handbook of Visual Information Processing", Edited by The Vision Society of Japan, Asakura Publishing Co., Ltd. (2000), p. 285, FIG. 7.1), there is no reference regarding a binocular vision, however, concrete examples of an optical system which represents a positional relationship among an object, an eyeglass lens, and an eyeball are described.

Firstly, examples in patent documents 1-3, that refer to improvements of binocular vision by eyeglasses, are mentioned in order to clarify problems.

The invention described in patent document 1 is a breakthrough patent as an approach to a binocular function. The patent document 1 describes a desired condition in which the binocular function is realized. Namely, a range of an astigmatism in a progressive band, an arrangement of the astigmatism and an alignment error in a whole of a lens, prism ranges of left and right eyeglass lenses, and a condition on directions of skews induced by the prisms are described. However, re-evaluating from the present, the invention described in patent document 1 includes some serious defects.

Firstly, an aberration calculation of a line of fixation emitted from a lens is performed without considering the Listing's law at one eye, which is a primary movement of the eyeball. In this case, the calculation of a residual astigmatism becomes uncertain, and it cannot say that there is the predetermined effect described in the document. Further, the movement of an eyeball of one eye can be considered as a rotational movement performed while centered at one point in the eyeball, that is, the center of the rotation. A frontal plane including the center of rotation at a position from where the eyeball is gazing front is called a Listing's surface. It is the law of major movements of an eyeball that the rotational axis of the eyeball lies within a Listing's surface, and it is called the Listing's law.

Secondly, it is written that progressive portions of the left and right lenses are within the predetermined prism ranges, and that almost the same astigmatisms and alignment errors are taken and defocuses are the same, therefore a stereoscopic vision (it appears that it is a binocular vision) is fine. However, in patent document 1, it is not shown that what balance of the astigmatisms and the alignment errors is fine for the stereoscopic vision, and the extent of fineness is not quantitatively shown. In this regard, it is not clear how the eyeglass lenses described in patent document 1 are configured.

Thirdly, on page 5, lines 25-44 of patent document 1, the explanation of "FIG. 2" of the document is not for an optical system for a binocular vision. This figure is shown in FIG. 22. In FIG. 22, when eyeballs 57 and 58 look straight at a point $P_P$ on a subject surface 59, lines of sights 50 and 51 are directed to the point $P_P$. Eyeglass lenses 52 and 53 are arranged in front of the eyeballs 57 and 58. By the prism effect of the eyeglass lenses 52 and 53, for a left eye 57, it is seen that the point $P_P$ is placed at an intersection point $P_L$ of the line of sight 54 and the surface 59, and, for a right eye 58, it is seen that the point $P_P$ is placed at an intersection point $P_R$. It is described in lines 41-42 on the same page that the relationship between the lines of sights shown in FIG. 22 can be deemed as one eyeglass lens which is symmetrical with respect to a prime meridian. However, as it can be seen from Prentice's formula, $(P=(h \times D)/10)$, a prism effect is proportional to a dioptric power. Therefore, this assertion is valid only for lenses such that the left lens and the right lens are identical.

Additionally, Prentice's formula is an approximation formula which is sufficient for ordinary use, and it means that prism P of a lens is proportional to a distance, h (in unit of mm), from the center and a diopter D. In short, since optical powers of a left lens and a right lens are generally different, the above described assertion is not obvious, and not established. Further, after the explanation of "FIG. 2" in patent document 1, the explanations are based on one of the left lens and the right lens throughout the document, without specifying a coordinate system and the origin that specify the target point $P_P$. Therefore, the configuration is not suitable for an optical system for a binocular function.

Fourth, the extent of the distortion shown in "FIG. 4" of patent document 1 is difficult to understand. This figure is shown in FIG. 23. The explanation of the figure in patent document 1 exists in line 17 on right column on page 5, where it is explained that the figure is an imaging figure of an equidistant and symmetrical lattice. FIG. 23 is a figure in which positional differences in horizontal direction are drawn from the point $P_P$, when a grid point of the lattice in the surface is set to the point $P_P$. Especially, it can be seen that it is distorted at the lower peripheral part. In lines 25-27 on the same column of patent document 1, it is explained that this is a saddle-shaped distortion or a barrel distortion. Namely, in patent document 1, it is taught that there is a relationship between the positional differences in horizontal direction, $\Delta P_H$, and the distortion. When it is assumed that there is a relationship between the positional differences in horizontal direction, $\Delta P_H$, and the distortion, the lattice is distorted when all the lines of sights 54 and 55 have intersection points other than the point $P_P$ on the surface 59. However, in this case, since the positional differences in horizontal direction are 0, a contradiction arises in that FIG. 23 becomes a figure which is not distorted. Therefore, the positional differences in horizontal direction, $\Delta P_H$, has no relationship with the distortion. Further, it is described that a distorted figure is processed as an image drawn with straight lines by a brain. However, a basis is not described regarding, to what extent the figure is distorted, the figure can be processed as lines, though it is an important matter. Therefore, it cannot be clearly understood whether the distortion shown in FIG. 23 becomes straight lines in a brain or not.

Fifth is that the target is on the surface. Basically, the target is arbitrarily determined by a designer. Therefore, in general, eyeglass lenses are designed so that performance of the eyeglass lenses becomes higher at an arbitrarily target determined by a designer. However, in patent document 1, the evaluation method is limited to candidates of the target which are adopted for eyeglass lenses for reading characters on a tight news paper or on a wall. Points within the target other than a fixation point in patent document 1 have big differences in distances from both of the eyeballs. Therefore, it becomes difficult to simultaneously adjust an error in power from the fixation point, a residual astigmatism, and prism. Consequently, the prism becomes bigger. Therefore, in a system in which the target is on a surface, it is difficult to evaluate a binocular vision.

In patent document 2, a design method for eyeglass lenses is proposed. In the design method, a state, in which a front view direction of a person wearing a pair of eyeglasses is shifted toward a side of a dominant eye, is considered. If the shift described in patent document 2 is true for a near vision, then it is an interesting phenomenon and, naturally, there should be an invention which utilizes the physiological phenomenon. However, patent document 2 includes the problems described below.

Firstly, an object to be measured is a living body. Thus, there is a problem on accuracy of measurement. In the example described in paragraph 0030 of patent document 2, it is written that the shift is 2 cm. If it is 2 cm, it is easy to measure, but if the shift is smaller, it becomes difficult to stably measure. It is described in paragraph 0063 of patent document 2 that it can be measured with "an absolute error of less than or equal to 3 mm." However, taking into consideration that an ordinary amount of an inset for near vision in a progressive power lens is 2.5 mm, the amount of the error is very large.

The second problem is that a phenomenon that "a front view direction is shifted toward a side of a dominant eye" contradicts Hering's law of equal innervations, which is the only one law regarding binocular eye movements. It is difficult to improve a binocular function by designing eyeglass lenses through a measure which is based on a phenomenon contradicting Hering's law of equal innervations. Here, an explanation of Hering's law of equal innervations can be seen in non-patent document 8 (written by Ryoji Osaka, Sachio Nakamizo, and Kazuo Koga, "Binocular Movement and Hering Theory, Experimental Psychology of eye movement", The University of Nagoya Press, (1993), Chapter 3, p. 60-61, written by Sachio Nakamizo). Hering's theory regarding binocular movement consists of a hypothesis that an innervation of version (ipsilateral binocular movement), which generates binocular movement, and an innervation of vergence (contralateral binocular movement) exist, a hypothesis of equal innervations of both eyes that means amounts of innervations assigned to respective eyes are always equal (Hering's law), and a hypothesis of additivity of innervations that means additivity holds between these two types of innervations.

Further, as a different opinion, it is known that a center of rotation is not fixed and it moves as well as shifts, during ocular movement. It is written, for example, in Japanese Published Examined Application No. SHO 42-9416B (on page 4, right column, lines 16-21) that the center of rotation is such that it does not rotate while centered by a single point and it rotates while centered by different points depending on its use. The assertion of "shift of the front view direction" in patent document 2 can be explained from the fact that a center of rotation of an eyeball itself shifts. Namely, when it is considered that centers of rotation move, a midpoint between the centers of rotation of left and right eyeballs also moves, and a front view direction also moves. In this manner, it is considered that an assumption that left and right eyeballs symmetrically move better conforms to the physiological fact than the assumption that left and right eyeballs asymmetrically move, which is insisted by patent document 2.

Thirdly, it is written in paragraph 0039 of patent document 2 that "a superior binocular fusion is brought." However, the extent is not clear. Specifically, it is written that if an occurred astigmatism (it is considered a residual astigmatism) is less than or equal to 0.5 diopter, then it is a comfortable field of vision. However, an error in power occurs depending on a target distance. Therefore, a comfortable field of vision is not realized, except for the case in which it is supposed that the target is placed at a position at which the error in power is 0. In an embodiment of patent document 2, two figures, which are a figure of errors in power and a figure of occurred astigmatisms, are shown, depending on conditions of observations. However, their balance are not mentioned. Therefore, it can be hardly understood whether comfortable fields of vision can be obtained, without showing the balance or relationship between an error in power and an occurred astigmatism.

Further, it is incorrect to insist that "a binocular fusion becomes better" by diagrammatically showing only errors in power and occurred astigmatisms. A disorder in which a binocular vision is disabled even if left and right eyes are gaining good abilities to see can be found mainly in many squint patients. In a conventional evaluation of an error in power and an astigmatism such as the evaluation in this patent document 2, the evaluation of performances specific to a binocular vision is not suitable.

Fourth, as in the case of patent document 1, the object of this patent is a surface, as it is apparent from "FIG. 1" or "FIG. 4" of patent document 2. Namely, things that are similar to the fourth indication regarding patent document 1 can be said.

In patent document 3, a technique regarding an eyeglass lens of so-called a wrap-around type, the lens being curved from its front towards an ear side, is disclosed. Further, on page 13 or page 15 of patent document 3, there are some descriptions about off-axis prismatic disparity. Here, defects regarding a binocular vision, the binocular vision being the thesis in patent document 3, are mainly described.

Firstly, it is written that techniques disclosed in patent document 3 are a technique about an eyeglass lens of a wrap-around type or an eyeglass lens of a protective eyewear. However, their configurations are unclear. In the main invention described in patent document 3, it is assumed that there are a prescribed area and a peripheral temporal area. The difference between these two areas lies in shapes of surfaces, as described in pages 28-30 of patent document 3. Here, a method of explaining the difference is not based on evaluation by ray tracing calculations which are commonly used at present, but it is a simplified method which calculates from a shape of a lens surface which has been used for the explanation of a progressive lens in the past. Therefore, the refractive power and the astigmatism are derived values of a curve which are calculated from derivatives of the surface. Thus they are different from those calculated by ray tracing. Further, similarly, there is no description regarding consideration of the Listing's law of movement of an eyeball, which is usually taken into consideration for designing at present. Therefore, it is different from an evaluation or a design which is based on a physiological basis, such as the Listing's law. Further, the peripheral temporal area is so arbitrarily that the difference from the prescribed area becomes not clear. Thus the peripheral temporal area is not forming a limiting condition. Therefore, it can be considered that the description is only valid for normal design of a lens.

Secondly, regarding the definition of off-axis prismatic disparity described in a lower part of page 13 of patent document 3, it is only described that "a defect on a binocular vision arises when an astigmatism at a temporal part and an astigmatism at a nasal part are not equal." However, the description is insufficient and it cannot be understood what astigmatisms are referred to. Further, as a method of correcting the off-axis prismatic disparity, there is only a description on page 15 of patent document 3 that an aspheric surface is adopted. Thus, the description is insufficient. In addition, though it is clear that the evaluation is performed with a single eye lens, it is concluded on page 13 of patent document 3 that "there is a defect on a binocular vision." The ground of the conclusion is not clear.

Thirdly, on page 15 of patent document 3, an adjustment among a refractive power, an astigmatism, and a disparity of a prism, and a balance of elements for an optical correction are mentioned. However, the description that a defect on a binocular vision is acceptable as long as the defect is within a range of the values of the table on page 15 cannot be understood. It can be read from this table that a correction amount decreases as a prescribed lens power becomes stronger. It can be read that, "an error is sufficiently corrected with a smaller correction and the defect on the binocular vision is acceptable," mean that when the prescribed lens power becomes stronger, a patient's tolerance on a binocular vision becomes greater. This assertion is difficult to understand, since it is a description of a tolerance based on single eye evaluation. With the subject matter of patent document 3, in which even a determination method of a tolerance of a binocular vision is not disclosed, it is hard to predict whether it is possible to design so that a tolerance becomes less than or equal to this tolerance, as with a normal standard for eyeglass lenses. Namely, with a description of such a tolerance in a state in which even a binocular vision is not defined, it is not easy to apply this tolerance to a lens design of another general prescription.

Here, it seems that the evaluation of a binocular vision through the single eye evaluation is based on a reason that a temporal portion and a nasal portion must be equal, since, when looking right, a right temporal portion is used in a right lens and a nasal portion is used in a left lens. However, this is a case where there is a precondition that a left lens and a right lens are the same, for example, as addressed in third problem of patent document 1. Such a prescription is very rare. Further, suppose a case in which it is asserted that prescriptions for a left eye and a right eye are almost the same. In this case, taking into consideration that the sensitivity limit in angle of sensory fusion is about 10 seconds in angle, it is difficult to capture a binocular vision with such a rough concept. Moreover, when applying to general-purpose lenses, it is problematic to apply the evaluation and the design that are based on such a tolerance, which lacks a physiological basis, to a human body, even if left and right prescriptions are not known in advance. As a result, there is a risk that it gives discomfort or it increases tiredness.

Next, it is considered that if it is possible to construct an Object-Eyeglass Lenses-Binocular Eyeball Optical System by extending a conventional Object-Eyeglass Lens-Single Eye Eyeball Optical System. FIG. 5 of non-patent document 9 shows a typical Object-Eyeglass Lens-Single Eye Eyeball Optical System. As shown in FIG. 24, a coordinate system of an optical system shown in FIG. 5 shows a center of eyeball rotation as the origin, and an azimuth angle α and an elevation angle β of a viewing angle as respective coordinate values. Additionally, a distance from the center of eyeball rotation to a lens is denoted by q'. Such an Object-Eyeglass Lens-Single Eye Eyeball Optical System as shown in FIG. 24 has been continuously adopted (here a viewing angle has been that of one variable), from the era of Tscherning, that is more than 100 years ago. In this system, the origin of the coordinate is placed at the center of eyeball rotation, since the eyeball rotates. A design reference point is placed at a lens geometrical center, that is a reference point of an aberration. The aberration is represented by differences in optical values along a line of fixation which extends from the center of eyeball rotation to an object through a lens reference point, while setting the design reference point as a reference point. Further, for a case of distant vision, it is common that an object is not shown, since the object is located at a distance of infinity. In order to extend this optical system to a system for a binocular vision, the origin must correspond to two centers of eyeball rotations. Therefore, some ingenuities are required.

Next, an object is considered, when the object is subjected to near vision of the Object-Eyeglass Lens-Single Eye Eyeball Optical System. In this case, technically, a near vision lens can be considered as an eyeglass lens. However, as a matter of fact, the lens is substituted by a far vision lens. Thus, "FIG. 2" of patent document 4, which shows an optical system with a progressive lens, is considered. This figure is shown in FIG. 25. In FIG. 25, a far-point sphere T of a line of sight 1 when viewing far from a center of rotation $C_R$ of an eyeball O and states of far view (∞) and near view (0.5 m=2 Dptr) through a progressive lens L are shown. The "object" in this figure is dedicated for the progressive lens and it is one of few examples which diagrammatically shows an object for near view. As shown in FIG. 25, an object at infinity is illustrated in the portion of far view. Conventionally, in the eyeglass industry, an object has been customary denoted with diopter notation. By denoting with diopter notation, as with this example, an infinite distance becomes visible. However, for an evaluation of lens performance, it is not necessary that the object is treated in this way, even if the lens is a progressive lens. Here, it is imagined that it has been arranged only for a target value of an optimization calculation. The subject matter of the invention described in patent document 4 is only for a single eye lens throughout the document, and there is no reference for a binocular vision. Therefore, it is unclear how the object becomes, when the optical system shown in FIG. 25 is extended for a binocular one.

It is considered that, including in the above described patent documents and non-patent documents, there is no Object-Eyeglass Lenses-Binocular Eyeball System, which is commonly used in the eyeglass lens industry, at a time when the present application is filed. Therefore, a configuration of a binocular vision, which can be commonly found in psychology, etc., is considered. There is no configuration of a binocular vision in which a pair of eyeglass lenses are worn. However, there is an Object-Binocular Eyeball System. For example, a Vieth-Muller circle or an iso-convergence circle described on page 39 of non-patent document 3 (Howard, I. P. and Rogers, B. J. "Binocular vision and stereopsis", Chapter 2, New York, Oxford Press (1995) p. 1-736) or on page 285 of non-patent document 10, etc., can be considered.

FIG. 26 is a diagram showing the Vieth-Muller circle, $C_V$, and the iso-convergence circle, $C_C$, described in non-patent document 10. The Vieth-Muller circle, $C_V$, is defined to be a circle which passes through nodal points $n_L$ and $n_R$ of left and right eyeballs, and a point F, when both the left eye Le and the right eye Re are fixating the point F. Further, the iso-convergence circle $C_C$ is defined to be a circle which passes through centers of rotations $C_L$ and $C_R$ of both eyeballs Le and Re, and a fixation point F. In FIG. 26, a middle point and a median plane of the centers of the both eyeballs $C_L$ and $C_R$ are denoted by a point M and a broken line $P_M$, respectively. As it is clear from FIG. 26, the Vieth-Muller circle, $C_V$, is a geometrical horopter (a set of points of outside objects which stimulate corresponding points on retinas of the both eyes; objects on a horopter do not generate retinal image differences) represented by the circle connecting the fixation point F of an object to be seen and the nodal points $n_L$, and $n_R$ of the both eyeballs. However, on this Vieth-Muller circle, $C_V$, when a pair of eyeglass lenses are worn, it does not become iso-convergence and, further, it does not have a characteristic such that it is equidistance from a self. Therefore, it cannot be evaluated in an eyeglass lens design. However, according to the Wells-Hering's laws of visual direction, there is an advantage that it is recognized that the origin is on the Vieth-Muller circle and that points on the Vieth-Muller circle are placed at almost equidistance from the self. The iso-convergence circle $C_C$ which is resembled to the Vieth-Muller circle $C_V$, namely one in which the nodal points on the Vieth-Muller circle are replaced with the centers of rotations of the eyeballs, is a circle which passes through the centers of rotations of the both eyeballs, and remaining portions are the same as the Vieth-Muller circle. Here, the Wells-Hering's laws of visual direction are laws regarding a question that "why the world seen is one, though it is looked through two eyes." The Wells-Hering's laws of visual direction are not the laws that directly answer this question, but they are known as the laws which define in what visual direction, the world is seen. Regarding these laws, points (a) and (b) below are known.

(a) An origin of a visual direction is at an eye of Cyclops, which is assumed to be at a middle point of both eyes.
(b) An object on an axis of vision can be seen on a line (a directional axis) connecting an intersection point of both eye axes and the eye of Cyclops.

For example, on page 56 of non-patent document 3, there is an empirical horopter. The figure is shown in FIG. 27. In FIG. 27, an empirical horizontal horopter $H_L$ and an empirical vertical horopter $H_V$ are ones in which distances, which can be psychologically seen as being equidistance form a self, are traced. The empirical vertical horopter $H_V$ has a characteristic such that it is inclined by 2-5 degrees from the vertical direction $V_t$ toward the back side (a side separated from the eyeballs $L_e$ and $R_e$). This confirms an experimental fact that it is easy to read, if it is tilted by about 10 degrees, during reading. Since an individual variation is large, it should be adopted as an individual element. However, it is difficult adopt, since actual measured values are few. Further, a range which can be seen to be equidistance is only a cylindrical portion in the figure and there is no other portion. Thus, it cannot be used as an eyeglass system.

As described above, conventionally, "Object-Eyeglass Lenses-Binocular Eyeball System," which locates an object of both eyes, a pair of eyeglass lenses, and both eyeballs, has not been clearly defined. In the field of psychology, there is a theory in which a neighborhood of a middle point of apexes of corneas of both eyeballs is taken as an origin of a visual direction. However, if that point is set as the origin, then the point moves when the eyeballs rotate up and down, and a conformity with a conventional Object-Lens-Single Eyeball System will be lost. It can be considered that a point on a middle line such that a distance between a fixation point and a center of rotation of one eyeball is equal to a distance between the fixation point and a center of rotation of the other eyeball is taken as the origin of the visual direction. However, it is problematic based on a similar reason. Conventionally, there are some cases in which it is tried to improve a binocular vision by processing of prism effects of eyeglass lenses. However, a realization of an evaluation method of a performance of a binocular vision, the evaluation method being based more on physiological knowledge, is desired.

Based on the above, it is an objective of the present invention to solve the problems described below.
1. To define an origin of a visual direction and a coordinate system that are suitable for an evaluation of a performance of a binocular vision, when a pair of eyeglass is worn.
2. To clarify an "object" which is closely related with an evaluation of a performance of a binocular vision.
3. To perform a quantitative evaluation of a performance of a binocular vision, which is based on a known physiological knowledge on a binocular function, the evaluation being valid in whole surface of a binocular field of view, and the evaluation not depending on a shape of an object.

SUMMARY

In order to solve the above problems, a method of evaluating eyeglass lenses according to the present invention includes steps 1-3 described below.

1. As a first step, it includes a step of setting an optical system using a coordinate system, for which an origin is placed at a midpoint of centers of rotations of both eyeballs, and in which an object is specified by a visual direction from the origin, the optical system including the object, left and right eyeglass lenses, and the both eyeballs. Namely, in the present invention, a configuration, which has been adopted for more than one century, and in which a center of rotation of an eyeball is set to an origin in a viewing direction, is abolished, and an origin in a viewing direction of an Object-Eyeglass Lens-Both Eyeballs System for a binocular vision is set to a midpoint between centers of rotations of the both eyeballs, in accordance with the Wells-Hering's laws of visual direction. The system includes the object to be seen, the eyeglass lenses, and the eyeballs, for optical calculations. The coordinate system can be arbitrary adopted, but, since a polar coordinate is usually adopted for the Object-Eyeglass Lens-One Eyeball System, the polar coordinate is preferable. With this coordinate system, performances of a binocular vision can be defined. Namely, the performances of the binocular vision are denoted, through this coordinate system, in terms of angles spanned with respect to an object, specifically, an azimuth angle and an elevation angle. Here, in this system, the centers of rotations of the eyeballs are not necessarily fixed points in the movements of the eyeballs of the system.

2. As a second step, it includes a step of calculating a reference value of an angle of convergence with lines of fixations for which a fixation point of the object is set as a viewing direction, the fixation point being an intersection point at which the lines of fixations cross with each other, after passing through design reference points of the left and right eyeglass lenses. The object in the Object-Eyeglass Lens-One Eyeball System, the system being established in the present invention, is an arbitrary object, and the present invention is not limited by the object. The object is set so that the explanation has concreteness. In the present invention, it is preferable that the object satisfies the following conditions. For a case of a single focus lens, the distances are the same when viewing from oneself, namely, a hemisphere in front of the eyes is preferable. In a case of a hemisphere, the radius can be set to, for example, a distance between an intersection point of lines of fixations and an origin, the lines of fixations being from the centers of rotations of left and right eyeballs and passing through the left and right design reference points. As a method of notation, the diopter notation, which has been a practice of the industry, can be used, and the position of the object can be specified with this.

For a case of a progressive power lens, the object is a viewing angle of the intersection point of the lines of fixations, which are from the centers of rotations the left and right eyeballs and pass through the design reference points, from the origin in the viewing direction. Then the object on the median plane becomes an object which is similar to the object shown in "FIG. 2" of patent document 4, namely, shown in FIG. 25. Other points are left as options of the designer of the progressive power lens. In many patents on a progressive power lens, usually an object is not disclosed. Therefore, it can be substituted by an object for a single focus lens, that is, a hemisphere whose radius is defined by the design reference point, and evaluated. As a more specific step, a lens shape is set so that a prescribed value is obtained at the design reference point of the eyeglass in the Object of the both eyes-Eyeglass Lenses-Both Eyeballs System. A prescription value and an angle of convergence from the centers of rotations of the eyeballs toward the eyeglass lenses in the both eyes are calculated, and it is set to a reference value of the angle of convergence.

3, As a third step, it includes a step of calculating the angle of convergence with the lines of fixations, the lines of fixations extending to an object evaluation point in an arbitrary viewing angle and passing through the left and right eyeglass lenses, and calculating a convergence aberration from a difference between the angle of convergence and the reference value of the angle of convergence. A vergence (contralateral binocular movement) of the Hering's law of equal innervations that is a law of motion of a binocular vision, namely, "the convergence aberration," which is a performance of a binocular vision derived from a convergence movement, is invented. The convergences include ones which are based on the lines of fixations on the image side, that is from the centers of rotations of the left and right eyeballs to the left and right eyeglass lenses, and ones which are based on the lines of fixations on the object side, that is from the left and right eyeglass lenses to the object. On both of the image side and the object side, the angle of convergence and the convergence aberration, which is derived from the angle of convergence through the definition described below, can be defined, and both of them are within the scope of the present invention. The angles of convergence and the convergence aberrations on the image side and on the object side have respective proportional relations such that proportionality coefficients are approximately proportional to a power of the lens. However, the values on the object side vary depending on a shape of the lens. Therefore, in the present invention, it is more preferable to use the angle of convergence based on the lines of fixation on the image side.

As a more specific step, for example, an error in power which depends on the evaluation point of the object in the Object-Eyeglass Lenses-Both Eyeball System, a residual astigmatism, and the angle of convergence that is from the center of rotation of the eyeball and extends to the eyeglass lens are calculated. A difference of the convergence at the evaluation point is obtained through setting the angle of convergence obtained at the second step as a reference. Hereinafter, the difference in the convergence is defined to be "the convergence aberration."

As described above, in the present invention, an origin in a viewing direction which is suitable for a binocular vision is defined. Therefore, when a prescription value is different, or when a frame has a different tilt angle or elevation angle, namely, it becomes possible to optically compare before and after changing an eyeglass, and it becomes possible to perform a consistent evaluation. Further, at a limit where a distance between the eyeballs becomes 0, it becomes the Object-Eyeglass Lens-Single Eyeball System, which has been used in general in the past. Therefore, it does not generate any contradiction with the conventional single eye design. Further, even if the distance between the eyeballs changes, the object is approximately equivalent. In other words, when the object is fixed, for eyeglasses between examinees (persons wearing the eyeglasses) having different distances between the centers of rotations of eyeballs, it becomes possible to compare their relative merit regarding a fusion, through the evaluation of the above described convergence aberrations.

The following are reasons why the convergence is focused for evaluation of a binocular function. Namely, from a knowledge of a functional aspect of living systems, it is known that a convergence latency is 150-200 ms, an impulsive eyeball movement is for 200 ms and about 800 times/sec, a movement control is 350-400 ms, and a pupillary near response is 400-450 ms. Taking these into consideration, among the movements of lines of fixations of an object, during a disparity-induced convergence movement which is a combination of the convergence and the impulsive eyeball movement, the control and the pupillary near response almost do not change in comparison with the convergence and the impulsive movement. Therefore, the convergence aberration is considered as an aberration having a higher priority than that of other aberrations, an error in power, and a residual astigmatism.

Further, when an object is a flat surface as with a conventional technique, a conventional error in power and a residual astigmatism are corrected through deformation of the eyeglass lens. However, a convergence is not considered at all. Since the convergence changes greatly depending on a fixation point, there is a case in which a fusion of a binocular function becomes difficult, and a binocular performance is degraded. In contrast, in the present invention, when the object of a single focus lens is set to be a hemisphere, a change in a visual environment at a time when the eyeball is rotated is small. Further, an object of a progressive power lens is left as an option, but, because of the convergence aberration, a quantitative evaluation of the object, for which a change in a visual environment is small, becomes possible.

Effect of the Invention

Because of the convergence aberration defined in the eyeglass lens evaluation method of the present invention, an evaluation based on a vergence (contralateral binocular movement) of the Hering's law of equal innervations that is a law of motion of a binocular vision, that is, based on a physiological knowledge that is derived from the convergence movement, becomes possible. Since there is one reference value for an evaluation, it becomes a uniform evaluation on whole of the binocular field of view, and an arbitrary object is possible. Further, because of the convergence aberration, it becomes possible to quantitatively evaluate a condition of a fusion, which is a performance of a binocular vision.

BRIEF DESCRIPTION OF THE DRAWINGS

FIG. 18A is a schematic diagram showing a sensory fusion, and FIG. 18B is a schematic diagram showing a motor fusion.

FIG. 19A is an example of a calculation of an angle of convergence when a pupillary distance PD is 60 mm, and FIG. 19B is an example of the calculation of the angle of convergence when the pupillary distance PD is 65 mm.

DETAILED DESCRIPTION OF EMBODIMENTS

Figure 1:
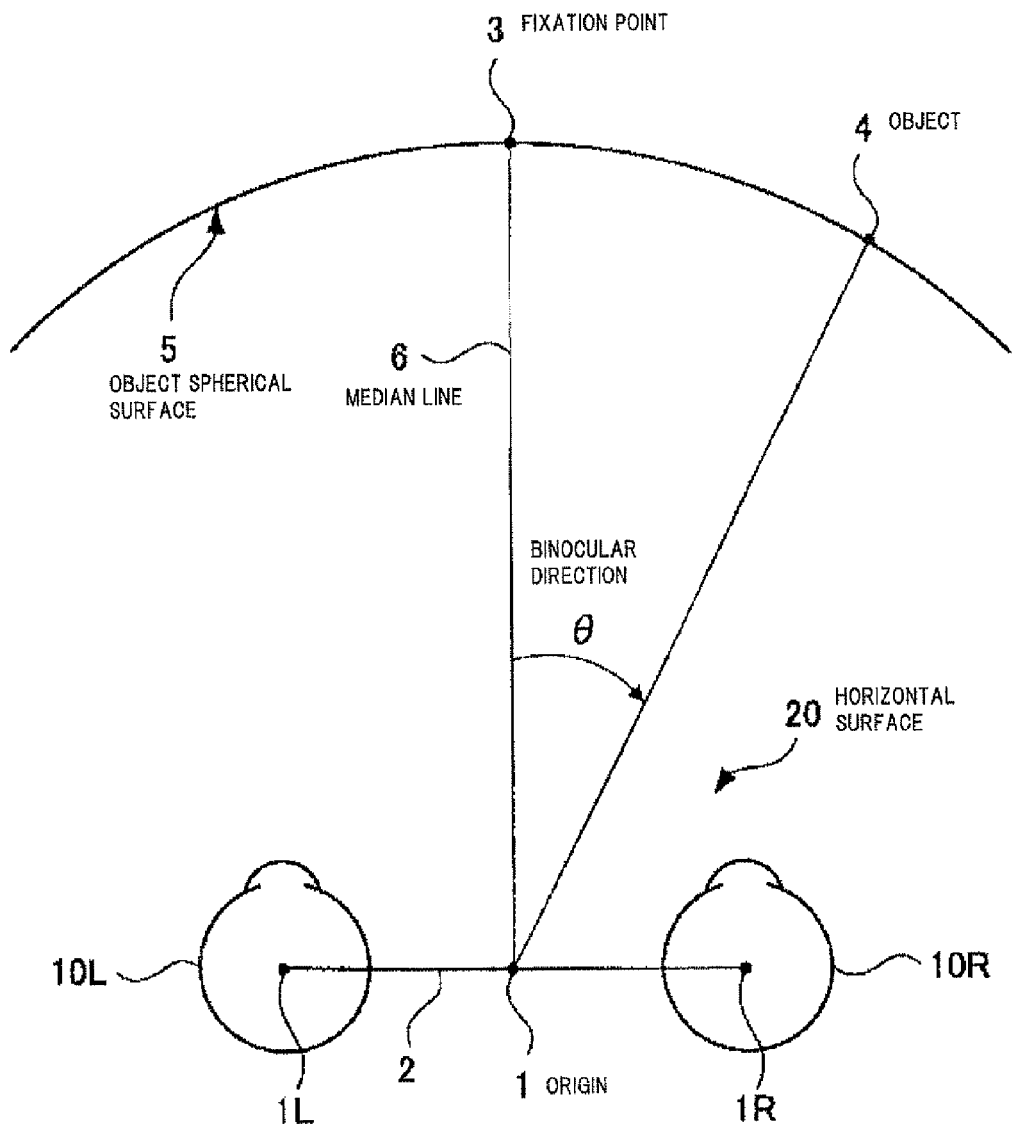
FIG. 1 is a diagram showing an Object-Eyeglass Lens-Eyeball System for explaining an "object" which is used in an embodiment of an eyeglass lens evaluation method of the present invention.

Embodiments of the present invention are explained below, but the present invention is not limited to the embodiments described below. It is explained in the following order.
[1] Evaluation method of eyeglass lenses
  (1) First step (a setting process of Object-Eyeglass lens-Binocular Eyeball System)
  (2) Second step (a calculating process of a reference aberration)
  (3) Third step (a calculating process of aberrations at arbitrary points)
  (4) A difference form a conventional example
  (5) An explanation of difference from an actual line of fixation
  (6) An explanation of a fusion threshold
[2] A design method of eyeglass lenses
[3] A manufacturing method and a manufacturing system of eyeglass lenses
[4] Embodiments of an evaluation method of eyeglass lenses
  (1) Embodiment 1 (an example where a power of astigmatism is 0)
  (2) Embodiment 2 (an example where a difference between left and right spherical diopter powers is greater than or equal to −2 D)
  (3) Embodiment 3 (an example where an elevation angle is 20 degrees)

Prior to a specific explanation of an embodiment of the present invention, technical assumptions and terms used in the embodiment are explained.

In order to perform an evaluation or design an eyeglass lens, it is necessary to determine a design reference point. This design reference point slightly differs for a single focus lens and for a multifocal lens. Thus, they are separately explained. For a single focus lens, a design reference point is a position at which prescription values (a spherical diopter power, an astigmatism degree, astigmatism axes, a prism value, a prism axis) are measured, and, in addition, at which a line of fixation and a lens crosses. This point is also called as a point of view, an eye point, or an optical centration point. When there is no prism, the design reference point is treated the same as an optical center. In a normal prescription, a design reference point of a lens is matched with a pupillary distance in the horizontal direction, and is matched with slightly below a pupil (about 10 degrees while centered by a center of rotation, about 4 mm) in the vertical direction, then it is put into a frame. For a reading lens, no individual design is specially performed and it is substituted by a general-purpose lens. Thus, for a prescription of a reading lens, a design reference point is provided at a position where a line of fixation from an object distance (25 cm-50 cm) crosses with the lens, and in the horizontal direction, the design reference point is set to slightly shorter distance (by 2-5 mm) (this is called a near pupillary distance and sometimes abbreviated as NPD) than the pupillary distance. In the vertical direction, the design reference point is matched with slightly below a pupil (about 20 degrees while centered by a center of rotation, about 9 mm), and it is put into a frame. For a multifocal lens, such as a progressive lens, reference points are separately provided for points to measure prescription values for far vision (a spherical diopter power, an astigmatism degree, astigmatism axes), an eye point (a point to be matched with a pupil), a prism measurement point, prescription values for near vision (powers added to the prescription values for far vision, namely, an added power). Usually, the eye point is matched with a pupil, and the reference points are put into a frame.

In the embodiment, a lens design is performed using a generally known ray tracing method. For example, in non-patent document 1 (Written by Tomowaki Takahashi "Lens Design," Tokai University Press (1994)), techniques regarding an optimization design of a lens by a ray tracing method and a wavefront aberration are described. A wavefront aberration is described in non-patent document 2 (Takeshi Noguchi et al, "ACTIVE OPTICS EXPERIMENTS I, SHACK-HARTMAN WAVE-FRONT ANALYZER TO MEASURE F/5 MIRRORS", Publ. Natl. Astrron. Obs. Japan Vol. 1, (1989), p. 49-55), etc. Additionally, in the technical field of eyeglass lenses, for a lens design, a lens measurement device which calculates an aberration (an error in power, an astigmatism, etc.) from a wavefront measurement after passing through an eyeglass lens is used.

An aberration caused by a lens along a principal ray entering a center of rotation of an eyeball from an object, when the object is viewed through an eyeglass lens, can be approximated by low-order aberrations, since an eyeball's pupil diameter is small. Here, the low-order aberrations in the technical field of eyeglass lenses are explained. The low-order aberrations include, for example, an error in power, a residual astigmatism, and a chromatic aberration.

Usually, for a distance lens, it is prescribed such that a refractive power of an eyeball is subtracted from a refractive power of a lens, so that an object in a front distant place can be clearly seen at a design reference point (usually, a position of the lens when an eyeball sees the front distant place through the lens). It can be said that an insufficient refractive power is compensated by a lens. At that time, an aberration is 0. In the prescription, when an astigmatism is at an eyeball at the design reference point, the astigmatism matches with an astigmatic axis of a lens. The astigmatic axis crosses perpendicularly with the principal ray, and, further, the astigmatic axis is a principal meridian of the refractive power. The principal meridian is, as with the eyeball, a path of a ray which is from an object and reaches to the center of rotation of the eyeball through the eyeglass lens. When the eyeball rotates in accordance with the Listing's law, unlike an ordinary coaxial optical system, the eyeglass lens is fixed and a direction of the eyeball relatively changes with respect to the eyeglass. At that time, at a point other than the design reference point, the refractive power of the lens slightly differs from the refractive power at the design reference point, because of the property of the lens. Even at that time, the refractive power of the eyeball is subtracted from the refractive power of the lens. The subtracted value is the aberration of the Lens-Eyeball system.

Regarding subtraction of aberrations, when rotated along an astigmatic axis of a lens in accordance with the Listing's law (there are two directions in the principal meridian direction), since the astigmatic axis of the lens coincide with an astigmatic axis of an eyeball, it suffices to merely subtract in each axis direction. Previously, the aberration at this time was called an aberration of a lens. However, if the eyeball rotates in a direction other than the astigmatic axis direction of the lens, the astigmatic axis of the lens becomes different from the astigmatic axis of the eyeball. Thus, a refractive power of a lens is decomposed in the direction of the astigmatic axis of the eyeball, and an average of quantities, the quantities being respective decomposed refractive powers subtracted by refractive powers in respective astigmatic axes directions, is becoming to be called as a power error. Since this power error is an average, it is unrelated with a difference in the astigmatic axis, and it is equivalent to a power error in a case where the astigmatic axes coincide with each other. However, an astigmatism takes a different value, that is different from the value when the axes coincide with each other.

Here, supposing that the above described values subtracted by the refractive powers in the two astigmatic axis directions of the eyeball are an aberration A and an aberration B, the power error is an average of the aberration A and the aberration B, and the residual astigmatism is a difference between the aberration A and the aberration B. When the Listing's law is not required, namely, when the eyeball rotates along with the astigmatic axis of an eyeglass, it was not called as a residual astigmatism, and it was called as an astigmatism, before. The power error in this case was called as MOE and the astigmatism was sometimes called as OAE.

Further, when an angle difference between a principal ray from a center of rotation of an eyeball to a rear surface of a lens and a principal ray from a front surface of a lens to an object is denoted by $\delta$ and an Abbe number is denoted by $v$, then a chroma aberration is expressed by $100 \times \tan \delta / v$.

[1] Eyeglass Lens Evaluation Method

Details of the first through three steps for implementing the above described eyeglass lens evaluation method according to the present invention are explained below.

(1) First Step (a Setting Step of an Object-Eyeglass Lens-Binocular Eyeball System)

First, an object is described in detail, in order to clarify a feature of the present invention. An optical system for performing optical calculation of a binocular vision in the present invention, that is Object-Binocular Eyeglass Lenses-Binocular Eyeball, is described. In the present invention, the object conforms to diopter notation, that is an industrial practice. Therefore, it is possible to show an object of any distance in a figure. Alternatively, an object of near vision is shown in a figure and an object of far vision may be an object of an infinite distance.

Figure 24:
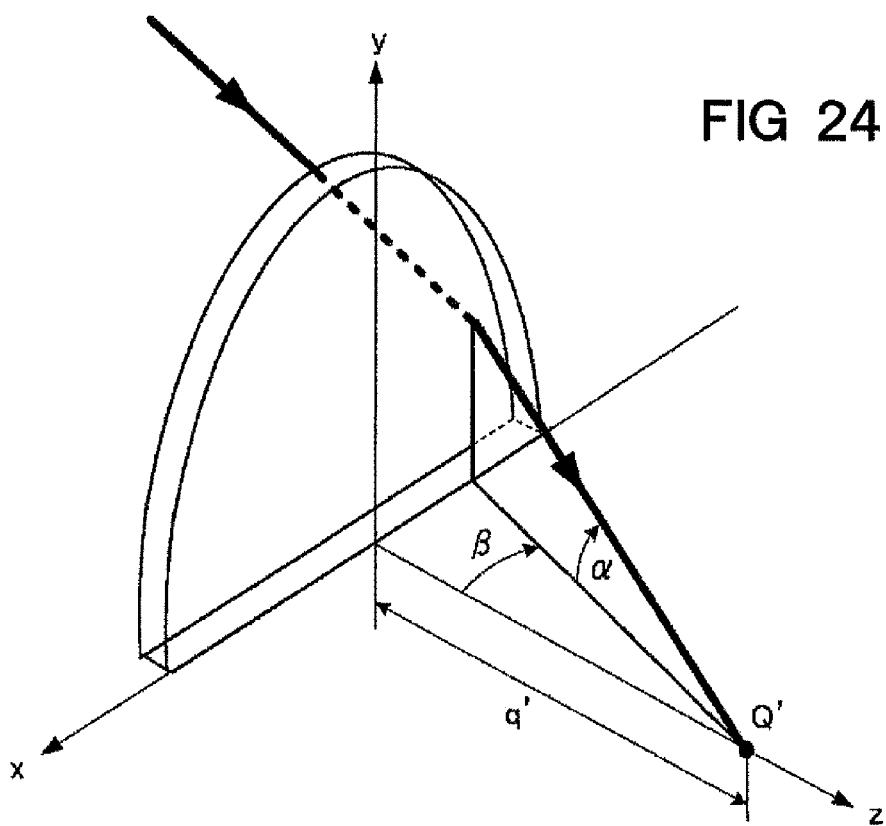
FIG. 24 is a diagram showing a configuration of a conventional Eyeglass Lens-Eyeball System by a single eye.
Figure 25:
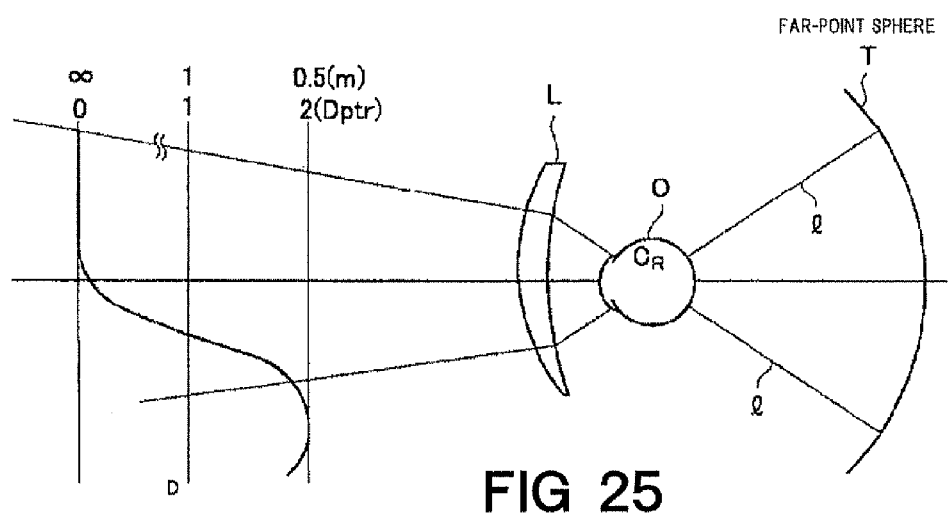
FIG. 25 is a diagram showing a configuration of a conventional Object-Eyeglass Lens-Eyeball System by a single eye.
Figure 26:
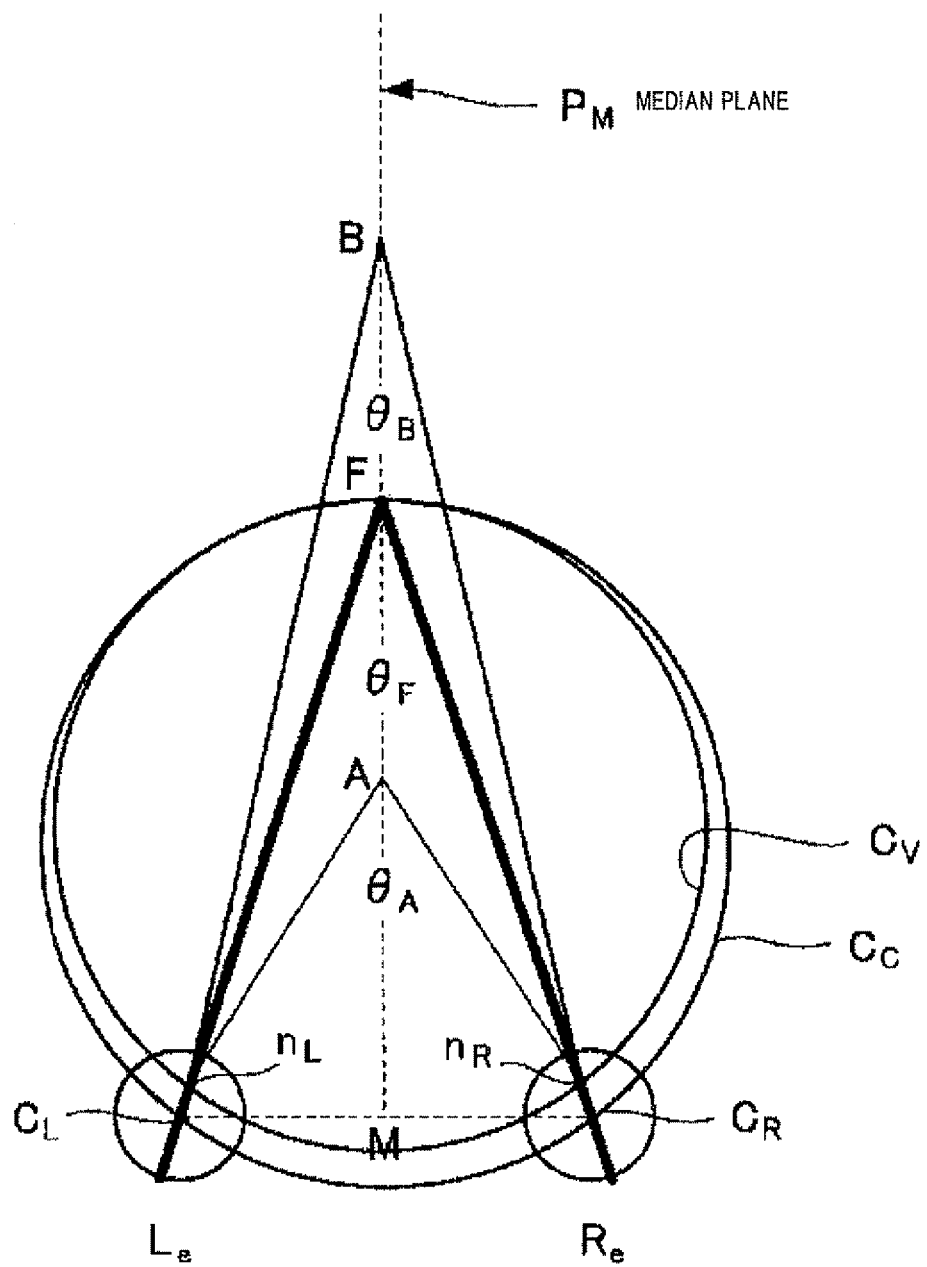
FIG. 26 is a diagram showing a Vieth-Muller circle and an iso-convergence circle.
Figure 27:
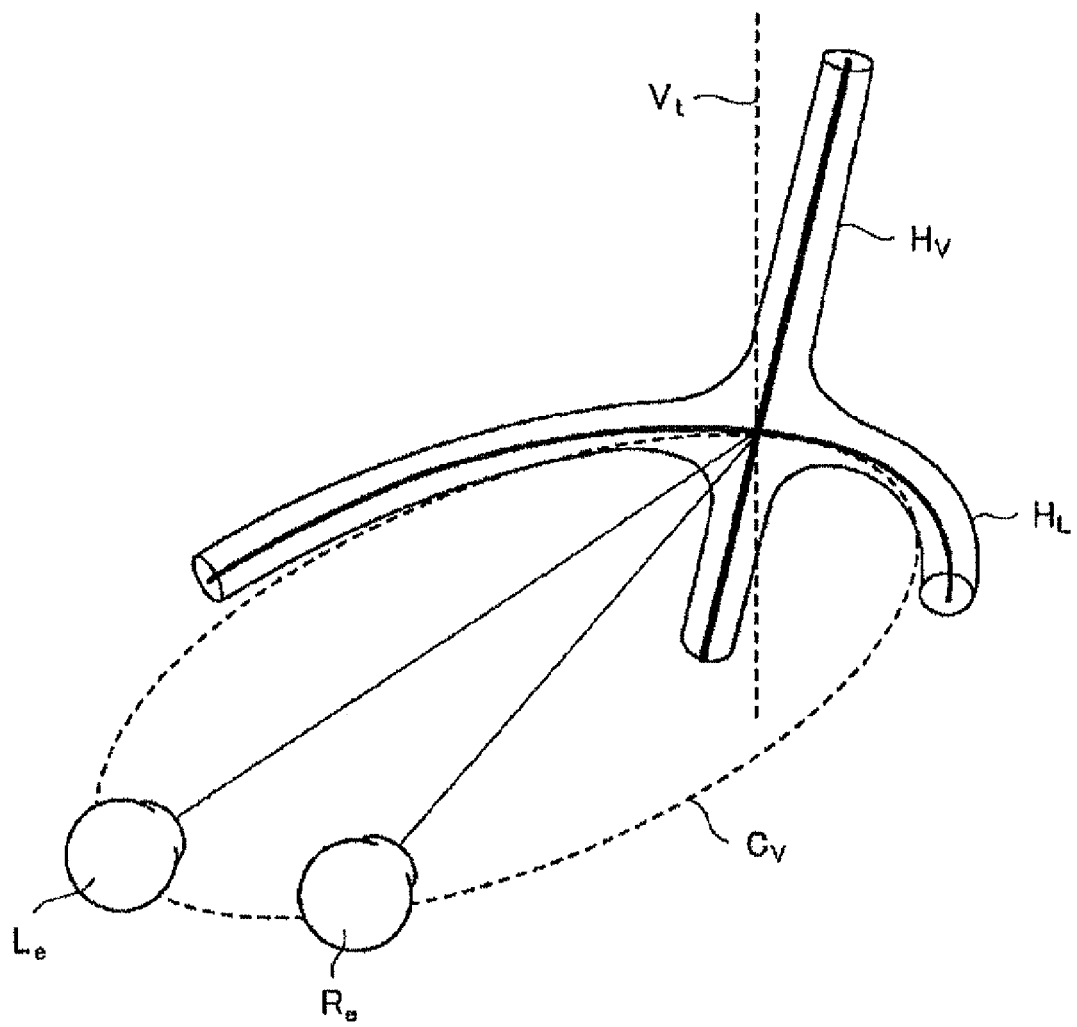
FIG. 27 is a diagram showing an empirical horopter.

A preferable object as an object used for the eyeglass lens evaluation method of the present invention is shown in FIG. 1. The explanation below is an explanation based on a line of fixation at a side of an image, and since everything are the same except for an explanatory diagram, an explanation based on a line of fixation at a side of an object is omitted. As shown in FIG. 1, firstly, a center of rotation of a right eyeball 1R and a center of rotation of a left eyeball 1L are set. In FIG. 1, an arrangement on a horizontal surface 20 which includes both the centers of rotations of the eyeballs 1L and 1R is shown. In FIG. 1, a middle point of both the centers of rotations of the eyeballs 1L and 1R is set to an origin 1 in a coordinate system in an Object-Eyeglass Lenses-Binocular Eyeball System. Then, an object 4 is defined on an object spherical surface 5 which is a hemisphere of the front eye centered by the origin 1 with a radius defined by a distance from the origin 1 to a fixation point 3. The centers of rotations of both the eyeballs 1L and 1R are placed within a frontal plane. When an object 4 is placed at infinity, it is considered as a limit where a radius of an object spherical surface 5 is enlarged. Further, a location of the object 4 is defined using an angle from a middle line 6, the middle line 6 passing through the origin 1, as a variable, instead of a view angle at a side of an image extending from the centers of rotations of both the eyeballs 1L and 1R to the eyeglass lenses, or a view angle at a side of the object extending from the eyeglass lenses to the object, as with a conventional optical system. Namely, an arbitrary position of the object 4 is defined as a function of an angle, the angle being based on the middle line 6 from the origin 1 of the system. This angle θ is defined to be a direction of a binocular vision. Further, as an example explained in FIG. 24, the direction of the binocular vision θ may be divided into a horizontal direction and a vertical direction. Additionally, a straight line connecting the centers of rotations of both the eyeball is a line segment between eyeballs 2.

Next, positions of the eyeglass lenses are explained. The eyeglass lenses are placed between a fixation point of a prescription value for a far point and the respective centers of rotations of the eyeballs 1L and 1R at that time. The eyeglass lenses have prescription values at lens design reference points, and they have arbitrary tilts with respect to a horizontal surface and a frontal plane (a front tilt angle, an elevation angle), and eccentricities (an eccentricity in a vertical direction, an eccentricity in a horizontal direction). A distance from a rear apex of a lens to the center of rotation of the eyeball is usually 27 mm, or 24-36 mm as described in lines 4-5 from the bottom in the right column on page 2 of Japanese Published Examined Application No. 42-941613. It is better to design as a separate element for a case where the distance is greater than or equal to 27±1 mm.

Next, with respect to an eyeball movement, it is assumed that a single eye obeys the Listing's law and binocular eyes obey the Hering's law of equal innervations. The centers of rotations of the eyeballs 1L and 1R move when the eyeballs rotate in up and down or in right and left, so that distances from the centers of rotations to apexes of corneas vary. Namely, when the left and right eyeballs view a near point, they converges because of an accommodation-convergence relation, however, it is known that the centers of rotations 1L and 1R move at that time. For the convenience of the explanation, it is explained with a system in which the centers of rotations of the eyeballs 1L and 1R are fixed, in the present invention.

(2) Second Step (a Step of Calculating a Reference Aberration)

In the second step, in order to make design reference points of a pair of eyeglasses of an Object of both eyes-Lenses-Binocular Eyeball System as references of calculating aberrations as described below, lens shapes are set so that they provide predetermined prescription values at the design reference points. In a progressive lens, the design reference points are usually separated at different lens positions such as a far vision power measuring point, a near vision power measuring point, and a prism measuring point. Further, for a single focus lens that is a near vision lens at the same time, in principle, various quantities for optical calculations are calculated along a principal ray extending from the fixation point on the object to the center of rotation and passing through the near vision power measuring point. On the other hand, there is a case in which it is prescribed by defining a near vision PD by simply subtracting 2 mm from a pupillary distance (it is called as PD) and setting it as a view point.

In any case, the lens shapes are formed so that the prescribed values are provided at the design reference points. The lens shapes are formed when the prescribed values converge at an optimization calculating process. Additionally, for cases of evaluations in which a pair of eyeglass lenses, that are general-purpose lenses, are worn, there are some cases in which the eyeglass lenses and lines of sights passing through the design reference points are not perpendicular. In these cases, slight aberrations occur at the design reference points because of the tilts, but the prescription values are attained in an approximation sense.

Figure 2:
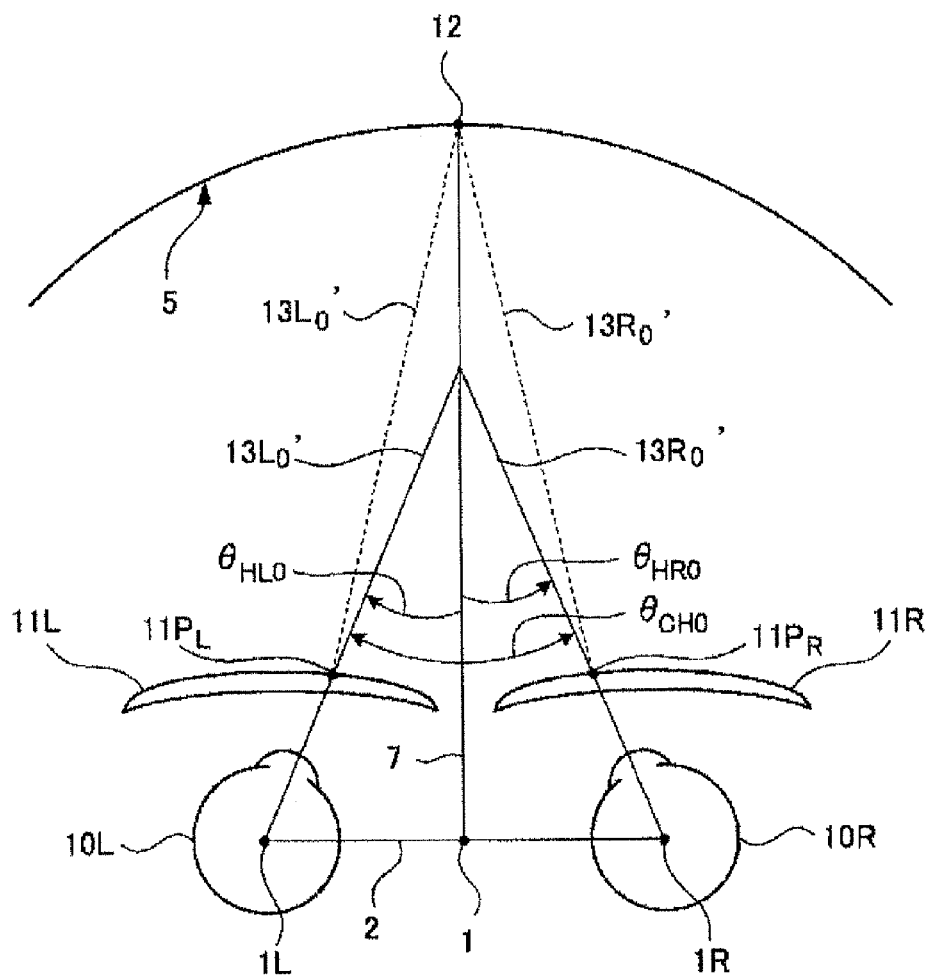
FIG. 2 is a diagram showing a reference value of an angle of convergence at an image side of the Object-Eyeglass Lens-Eyeball System which is used in the embodiment of the eyeglass lens evaluation method according to the present invention.

Here, the prescription values are, a spherical diopter power, power of an astigmatism, an astigmatic axis, a prism, a prism axis, and an additional power. Since an aberration is defined to be a difference from a reference, these prescription values become references. FIG. 2 shows a state in which both eyeballs 10L and 10R are viewed from above. In FIG. 2, portions corresponding to FIG. 1 are provided with the same reference numerals, and an overlapped explanations are omitted. Lines of fixations 13L0 and 13R0 which pass through respective reference points of a left eyeglass lens 11L and a right eyeglass lens 11R from a left eye 10L and a right eye 10R, respectively, are refracted by the eyeglass lenses 11L and 11R, become eye directions 13L0' and 13R0', and intersect with each other on an object 12 on a median plane 7 on the object spherical surface 5. Namely, it is configured so that the object 12 (an object disposed at a position where the lines of fixations 13R0 and 13L0, from the centers of rotations of eyeballs 1L and 1R of the left and right eyes 10L and 10R and passing through the design reference points 11PL and 11PR, intersect on the object spherical surface 5 after passing through the lenses, by use of a normal ray tracing method) is disposed on the median plane 7. Even if it is not disposed on the median plane 7, it is attained while converging during an optimization calculation process. Here, the reason why the object 4 in FIG. 1 and the object 12 in FIG. 2 are assigned the different reference numerals is that, in general, the design reference points 11PL and 11PR of the eyeglass lenses 11L and 11R are not on the horizontal surface 20.

Here, in order to define an angle of convergence, for convenience of a later explanation, a projection component in a direction perpendicular to the median plane of a median line of the lines of fixations 13L0 and 13R0 of the left and right eyes 10L and 10R is defined to be "a surface parallel component," and a component in a direction parallel to the median plane is defined to be "a surface perpendicular component." Here, "the median line" in the present invention is said to be a line passing through a middle point (the origin) of the centers of rotations of the left and right eyeballs on the side of the image, passing through the reference point on the side of the object, and having an average of direction cosines of the left and right lines of fixations, when the line is expressed in terms of a direction cosine. Surface parallel components of angles between the left and right lines of fixations 13L0, 13R0 and the median lines of the lines of fixations 13L0, 13R0 are defined to be $θ_{HL0}$ and $θ_{HR0}$, respectively. Further, surface perpendicular components of angles between the left and right lines of fixations 13L0, 13R0 and the median lines of the lines of fixations 13L0 and 13R0 are defined to be $θ_{VL0}$ and $\theta_{VR0}$, respectively. Additionally, an angle of convergence in the surface parallel direction $\theta_{CH0}$ is defined to be the sum of $\theta_{HR0}$ and $\theta_{HL0}$. Signs of $\theta_{CH0}$, $\theta_{HR0}$, and $\theta_{HL0}$ are arbitrary as long as they have consistency, but in the present invention, when the eyeballs are in a convergent state, all of them are positive values. Positive and negative are reversed, when the eyeballs are in a diverged state. Similarly, the surface perpendicular component is denoted by $\theta_{CV0}$, and it is defined to be the sum of $\theta_{VR0}$ and $\theta_{VL0}$. Usually, the centers of rotations of the left and right eyeballs are almost on the same horizontal surface, but there are some cases in which there are slight deviations. Therefore, as with the surface horizontal direction, $\theta_{CV0}$ is set to a positive value during a convergent state, and it is set to a negative value during a diverged state. Representing with formulas, the surface horizontal component $\theta_{CH0}$ and the surface perpendicular component $\theta_{CV0}$ of the angle of convergence which is to be a reference (a reference value of the angle of convergence) become as follows:

$$\theta_{CH0}=\theta_{HR0}+\theta_{HL0}$$

$$\theta_{CV0}=\theta_{CR0}+\theta_{VL0}$$

In general $\theta_{CV0}$ is 0, and the lens shape and the reference point are set so that it becomes 0.

Figure 3:
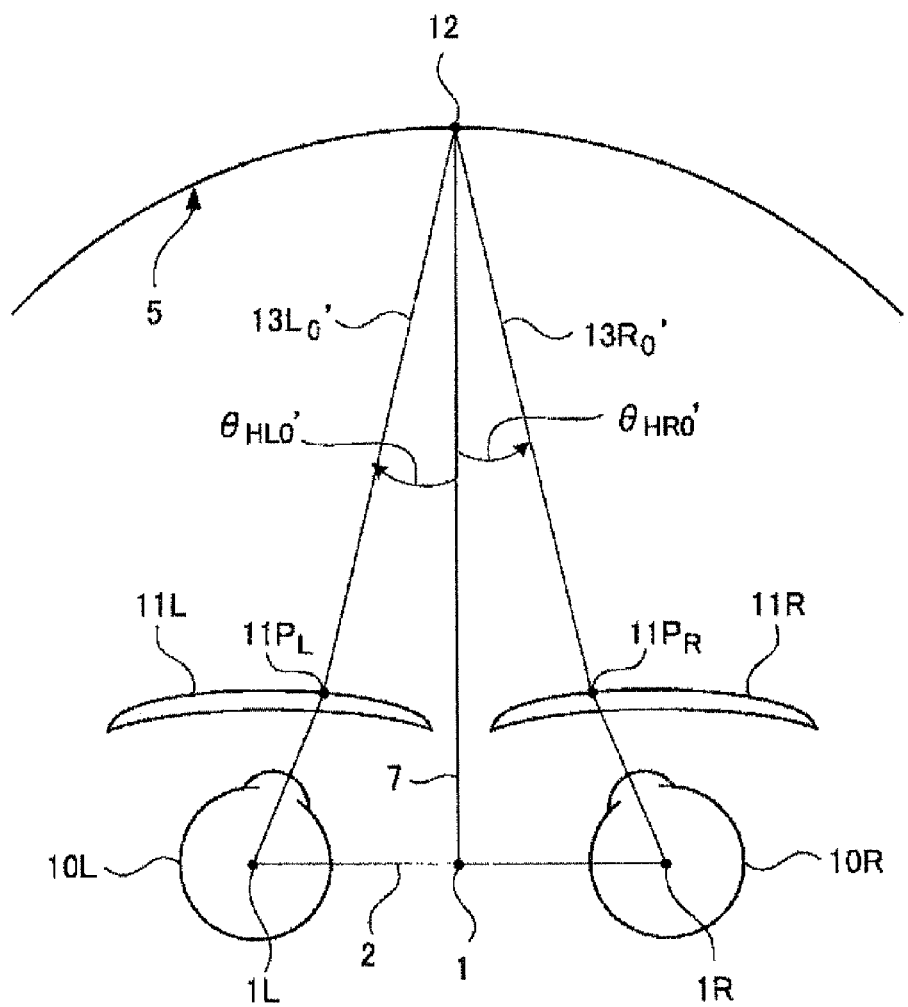
FIG. 3 is a diagram showing a reference value of an angle of convergence at an object side in the Object-Eyeglass Lens-Eyeball System which is used in the embodiment of the eyeglass lens evaluation method of the present invention.
Figure 4:
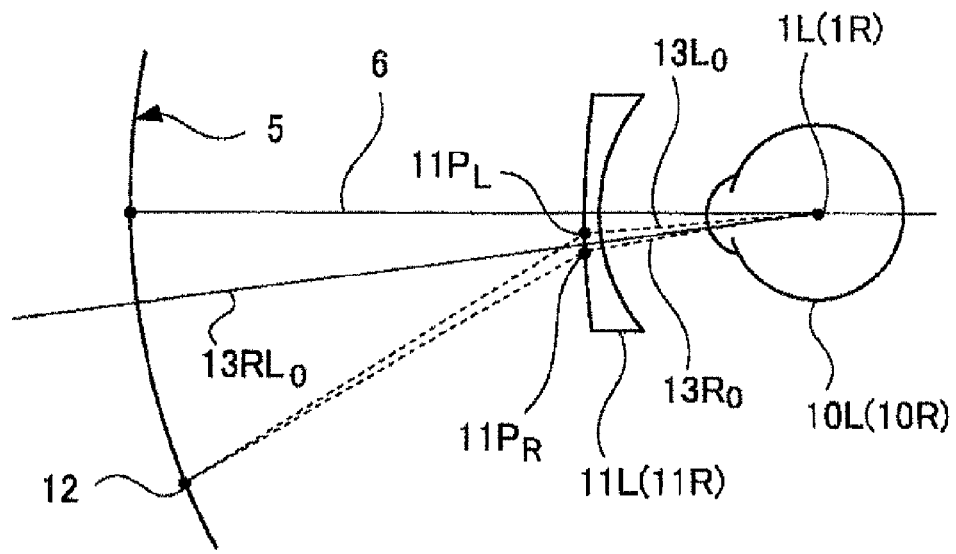
FIG. 4 is a diagram viewing the Object-Eyeglass Lens-Eyeball System shown in FIG. 2, which is used in the embodiment of the eyeglass lens evaluation method of the present invention, from a direction which is perpendicular to a median plane, and illustrating a convergence aberration defined at the image side in a direction perpendicular to the plane.
Figure 5:
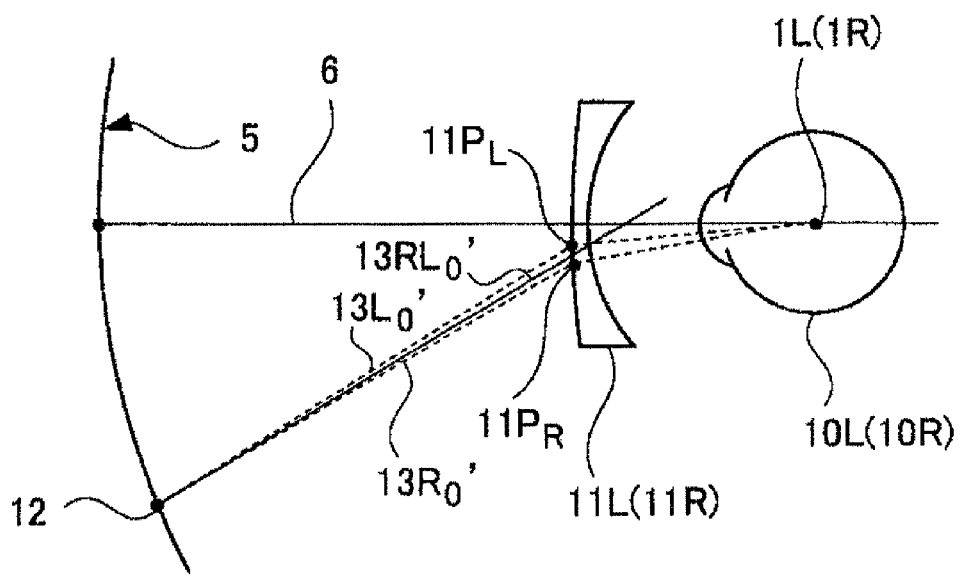
FIG. 5 is a diagram viewing the Object-Eyeglass Lens-Eyeball System shown in FIG. 3, which is used in the embodiment of the eyeglass lens evaluation method of the present invention, from a direction which is perpendicular to a median plane, and illustrating a convergence aberration defined at the object side in a direction perpendicular to the plane.

FIG. 3 is a figure which shows that the angle of sights $\theta_{HL0}$ and $\theta_{HR0}$ defined on the side of the image in FIG. 2 are set to angles of sights $\theta_{HL0}'$ and $\theta_{HR0}'$ by the lines of fixations 13L0' and 13R0' on the side of the object. FIG. 4 and FIG. 5 are figures viewing FIG. 2 and FIG. 3 from the side, respectively. It can be seen that the median line 13RL0 of the lines of fixations 13L0 and 13R0 on the side of the image and the median line 13RL0' of the lines of fixations 13L0' and 13R0' on the side of the object pass through the origin 1 and incline from the median line 6 that extends to the object 12. Additionally, as with the definition on the side of the image, the following are obtained on the side of the object $$\theta_{CH0}'=\theta_{HR0}'+\theta_{HL0}'$$

$$\theta_{CV0}'=\theta_{VR0}'+\theta_{VL0}'$$

(3) Third Step (an Aberration Calculating Process at an Arbitrary Object Evaluation Point)

Figure 6:
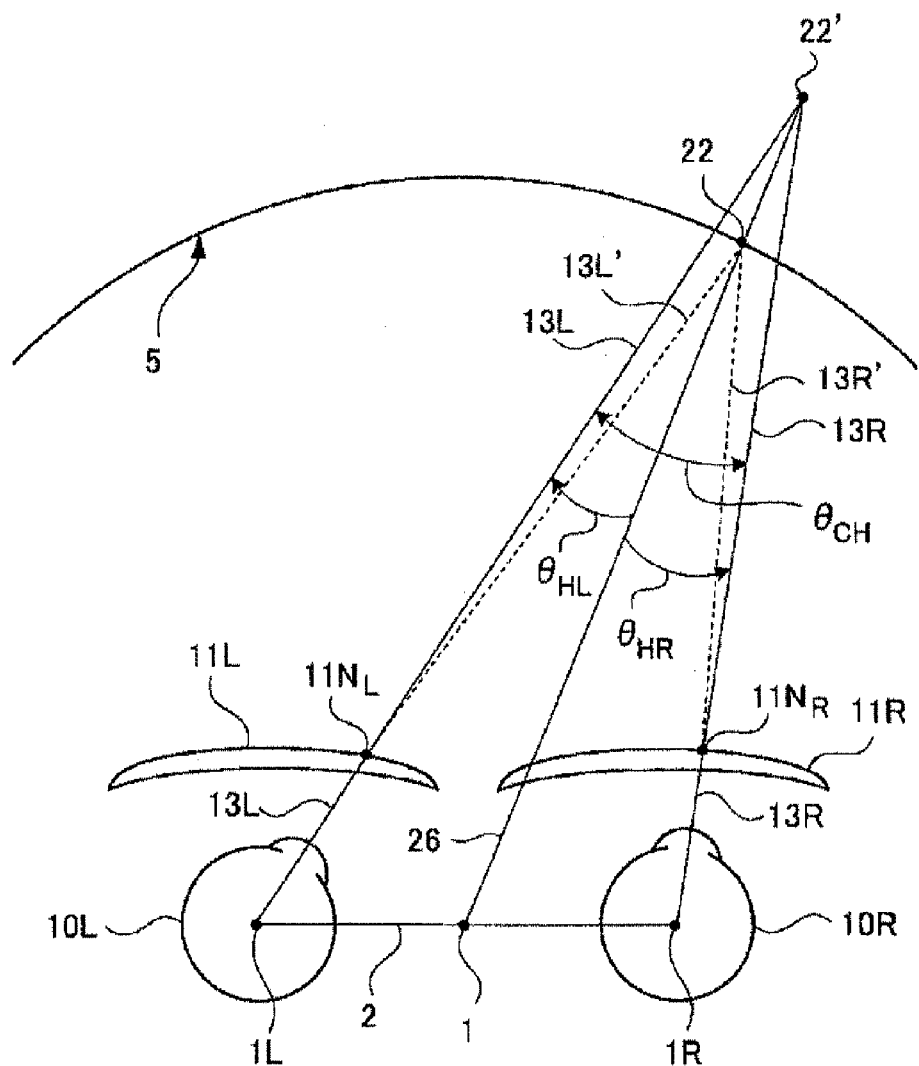
FIG. 6 is a diagram showing the angle of convergence on the image side at an evaluation point in the Object-Eyeglass Lens-Eyeball System, which is used in the embodiment of the eyeglass lens evaluation method of the present invention.

The definitions of the optical calculations, etc., of the binocular system explained in the second step are further described in detail, and an optical evaluation is performed at an arbitrary lens evaluation point. A schematic configuration of a binocular system in an arbitrary binocular direction is shown in FIG. 6. Details of the optical calculation are explained with reference to FIG. 6. An arbitrary position of an object in an arbitrary binocular direction from the origin 1 of the binocular system is set to an evaluation point 22. Among the lines of fixations starting from the centers of rotations of the left and right eyes 1L and 1R, passing through evaluation points 11NL and 11NR of the left and right eyeglass lens 11L and 11R, refracting and passing through the evaluation point 22, by using the ray tracing method, the extension lines on the side of the image of the lines of fixations are set to 13L and 13R. Here, in the example shown in the figure, the case is shown in which the intersection point 22' of the lines of fixations 13L and 13R are disposed outside of the object sphere 5. Even if the intersection of the lines of fixations 13L' and 13R' are not able to pass through the evaluation point 22 with a single trial, the optical rays which converges at the evaluation point 22 can be calculated with a required precision by changing the angles of the rays emitted from the centers of the rotations of the eyeballs 1L and 1R.

Here, as a surface horizontal component of an angle of convergence $\theta_{CH}$ at the evaluation point 22 is defined as below:

$$\theta_{CH}=\theta_{HR}+\theta_{HL}$$

Similarly, a surface vertical component of the angle of convergence $\theta_{CV}$ at the point 22 can be defined as below:

$$\theta_{CV}=\theta_{VR}+\theta_{VL}$$

Here, surface parallel components of the angles pinched by the median line 26 of the lines of fixations 13L and 13R and the lines of fixations 13L and 13R, that include the median line 26 of the lines of fixations 13L and 13R, and that are parallel to a surface perpendicular to the median surface, are set to $\theta_{HL}$ and $\theta_{HR}$, and similarly, in the vertical direction, surface perpendicular components, that include the median line 26, and that are parallel to a surface parallel to the median surface are set to $\theta_{VL}$ and $\theta_{VR}$.

Figure 7:
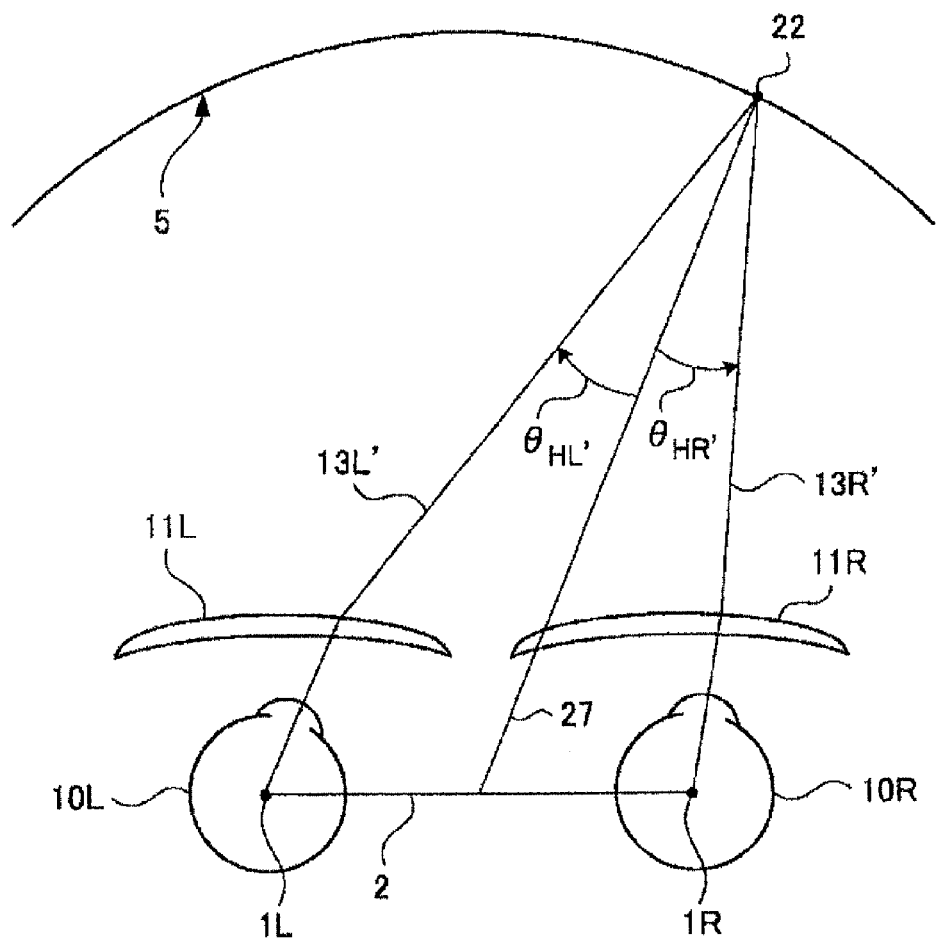
FIG. 7 is a diagram showing the angle of convergence on the object side at an evaluation point in the Object-Eyeglass Lens-Eyeball System, which is used in the embodiment of the eyeglass lens evaluation method of the present invention.

Namely, a surface parallel component and a surface perpendicular component of a convergence aberration at the evaluation point 22 are represented as follows:

(the surface parallel component of the convergence aberration): $\theta_{CH}-\theta_{CH0}$ (the surface perpendicular component of the convergence aberration): $\theta_{CV}-\theta_{CV0}$ FIG. 7 is a diagram showing angles of convergence $\theta_{HL}'$ and $\theta_{HR}'$, when they are defined with the lines of fixations 13L' and 13R' at the side of the image. In this case, surface parallel components of the angles pinched by the median line 27 of the lines of fixations 13L' and 13R' and the lines of fixations 13L' and 13R, that include the median line 27 of the lines of fixations 13L' and 13R', and that are parallel to a surface perpendicular to the median surface, are set to $\theta_{HL}'$ and $\theta_{HR}'$, and similarly, in the vertical direction, surface perpendicular components, that include the above described median line 27, and that are parallel to a surface parallel to the median surface are set to $\theta_{VL}'$ and $\theta_{VR}'$. At this time, as with the above described definitions on the side of the image, a surface parallel component and a surface perpendicular component of a convergence aberration defined at the side of the object at the evaluation point 22 are, based on $$\theta_{CH}'=\theta_{HR}'+\theta_{HL}'$$

$$\theta_{CV}'=\theta_{CV}'+\theta_{VL}',$$

represented as follows:

(the surface parallel component of the convergence aberration): $\theta_{CH}'-\theta_{CH0}'$ (the surface perpendicular component of the convergence aberration): $\theta_{CV}'-\theta_{CV0}'$ Differences of optical values along the lines of fixations 13L and 13R shown in FIG. 6, with reference to optical values along the lines of fixations 13L0 and 13R0 explained in FIG. 2, are aberrations. Namely, the spherical diopter power, the astigmatism degree, the astigmatism axes, and the angle of convergence, that are calculated at the second step, are set as references, and at the third step, an error in power and a residual astigmatism are calculated from differences of the spherical diopter power, the astigmatism degree, and the astigmatism axes. With respect to the angle of convergence, the convergence aberration is obtained based on the above described definition. Defining again in detail, a convergence aberration is a difference in the angle of convergence, when setting an optical quantity along the principal ray, the principal ray extending from an object to a center of rotation of an eyeball and passing through a design reference point, as a reference.

The convergence aberration defined in the present invention is different from an ordinary binocular retinal image difference. Specifically, a convergence aberration is different from an ordinary binocular retinal image difference in a point that it is an aberration in an angle of convergence in a state in which left and right correcting glasses are worn, in a point that it is an aberration when an object defined in a binocular direction (the arbitrary evaluation point 22 on the object spherical surface 5 including the median surface) is viewed, and in a point that it is defined, not with nodal points, but with the fixation lines passing through the centers of rotations of the eyeballs. Further, it is different from the binocular retinal image difference in a point that there are movements of eyeballs. Here, the definition of the binocular retinal image difference is based on pages 283-287 of non-patent document 10.

Further, the convergence aberration defined in the present invention is further different from an angle of convergence, which is appeared in psychology. Regarding the "angle of convergence" defined in psychology, there is a description, for example, in "Convergence Movement and Binocular Stereopsis" (Optical Review, Vol. 23, No. 1 (January 1994), p. 17-22). In this description, it is written that "an angle between a fixation point (an intersection point of visual axes) and a point of rotation of each of eyes (the centers of rotations)." Differences between a convergence aberration and an angle of convergence lie in a point that it is an aberration of an angle of convergence in a state in which left and right correcting lenses are worn, in a point that it is an aberration when an object, which is defined in a binocular vision direction, is viewed, and in a point that an angle between lines of fixations passing through left and right reference points of an eyeglass is set to a reference value for obtaining a difference in aberrations. It can be seen that the value is completely different from the convergence aberration of the present invention which is defined from viewing angles of the lines of fixation which pass through an eyeglass and reach to the evaluation point.

(4) Differences from a Conventional Example

Here, differences between the convergence aberration and a difference in a horizontal direction or a difference in a vertical direction, described in patent document 1, are considered again. The following 5 points are considered as the differences of the convergence aberration:

a. The definition is based on a vergence (contralateral binocular movement) of the Hering's law of equal innervations that is a law of motion of a binocular vision, namely, the definition is based on a physiological knowledge derived from a convergence movement.
b. It is possible to use an arbitrary object defined by a binocular vision direction.
c. Evaluations based on a same basis can be done throughout the whole field of vision, since there is one basis for evaluations.
d. By inventions of the surface parallel component and the surface perpendicular component, it is physiologically an appropriate definition when it is divided into components and when it is displaced from a horizontal surface.
e. A position of an object is not defined on a surface, but it is defined stereoscopically.

Figure 8:
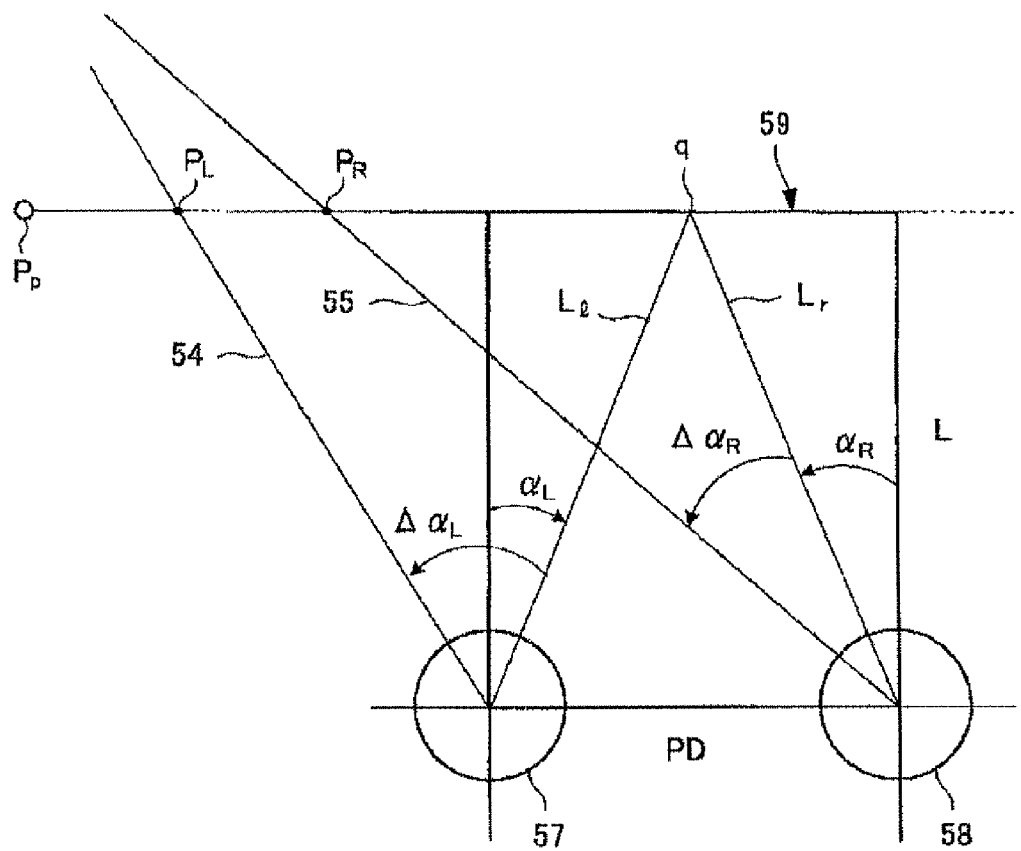
FIG. 8 is a diagram showing an Object-Eyeglass Lens-Eyeball System in a comparison example.

Here, a difference in the horizontal direction and a difference in the vertical direction described in patent document 1 are analyzed in detail. The horizontal component in "FIG. 2" of patent document 1 is shown in FIG. 8. Since the vertical direction is similar, only a position difference $\Delta P_H$ in the horizontal direction described on page 5, line 35 of patent document 1 is explained below. As shown in FIG. 8, a distance between the centers of rotations of both the eyeballs is set to PD and a distance from the centers of rotations of both the eyeballs to the surface 59 including a point P is set to L. Further, it is not shown in the figures in patent document 1, but an equal dividing point of the centers of rotations of both the eyeballs, which also is a point on the object surface 59, is set to a point q. The point q is defined to be an intersection point where the lines of fixations Lr, Ll from the centers of rotations of both the eyeballs in a front direction and the surface 59 cross. Viewing angles of the lines of fixations Lr and Ll are set to $\alpha_R$ and $\alpha_L$, and viewing angles of lines of fixations 54 and 55, from the lines of fixations Lr and Ll, are set to $\Delta\alpha_R$ and $\Delta\alpha_L$, respectively.

Then, the position difference $\Delta P_H$ in the horizontal direction is expressed as follow:

$$\Delta P_H = L \times \tan(\alpha_R + \Delta\alpha_R) - L \times \tan(\alpha_L + \Delta\alpha_L) - PD$$

Further, a distance between the centers of rotations of both the eyeballs PD has the following relation, when using $(\alpha_R)$, $(\alpha_L)$, and L:

$$PD = L \times \tan(\alpha_R) - L \times \tan(\alpha_L)$$

The difference in the horizontal direction is described as dividing the positional difference in the horizontal direction by an object distance L. Thus the following formula is established:

The difference in the horizontal direction $= \tan(\alpha_R + \Delta\alpha_R) - \tan(\alpha_L + \Delta\alpha_L) - PD/L$ By substituting PD, the following is obtained:

The difference in the horizontal direction $= \tan(\alpha_R + \Delta\alpha_R) - \tan(\alpha_L + \Delta\alpha_L) - (\tan(\alpha_R) - \tan(\alpha_L))$ Here, only when $\Delta\alpha_R$ and $\Delta\alpha_L$ are sufficiently small at a center portion of the field of vision, the following approximation formula is established:

The difference in the horizontal direction $= \Delta\alpha_R - \Delta\alpha_L$

Therefore, "the difference in the horizontal direction" in patent document 1 represents, in a very limited narrow area of the center portion of the field of vision, a difference in an angle of convergence when the point P on the same surface 59 is viewed while making the angle between the lines of fixations Lr and Ll as a reference. However, this becomes a quantity which has no relationship with the angle of convergence in an area other than the center portion in which $\Delta\alpha_R$ and $\Delta\alpha_L$ are large, and this becomes a value which has no basis in physiology.

If the difference in horizontal direction, which has no physiological basis, is used as-is as an evaluation function, it can be understood that it has the following problems for an evaluation of a performance of a pair of eyeglasses.

1. The point P and the point q must be on the same object surface 59 as with the explanation figure of Zeiss. Therefore, except for a surface for which the object surface is parallel to the frontal plane, for the difference in the horizontal direction, the reference point changes for each of the distances to the object and it cannot be an evaluation method for a whole of the lens. Namely, it does not have a property as an aberration.
2. When the object is the same object surface 59 as with the Zeiss patent, it becomes a single basis, and it has a property as an aberration. However, when $(\alpha_R)$, $(\alpha_L)$, $(\Delta\alpha_R)$, and $(\Delta\alpha_L)$ become large, since the tangent has a non-linearity with respect to an angle, it does not match with the angle of convergence that is represented by the difference of the angles $\Delta\alpha_R - \Delta\alpha_L$. Therefore, the difference in the horizontal direction does not have a physiological basis in a periphery of the visual field.

3. Similarly, when the lines of fixations 54 and 55 shift from the horizontal surface, it becomes different from the original angle of convergence.

According to the above explained definition of patent document 1, it cannot be a single uniform definition for the whole of the object surface, and it becomes an evaluation function having no physiological basis around the periphery of the visual field. It is improper to evaluate a binocular vision using an unclear definition which does not have any basis.

(5) Explanation of Difference from an Actual Fixation Line

Next, differences between a fixation line according to the ray tracing method in the present invention and an actual fixation line are explained in detail. With respect to the surface parallel direction, there is an arbitrary correspondence relationship within divergence boundaries and convergence boundaries of eyeballs, Therefore, it is possible that, in the surface parallel direction of the lines of fixations 13L0' and 13R0' in FIG. 6, they always pass through the evaluation point 22. Here, it is explained in accordance with non-patent document 8. When setting an ipsilateral binocular movement to $\theta$, a contralateral binocular movement to $\mu$, a momentum of the right eye to $M_R$, a momentum of the left eye to $M_L$, the Hering's law of equal innervations can be expressed by the following formulas:

$$\theta + \mu/2 = M_R$$

$$\theta - \mu/2 = M_L$$

Then, within the divergence boundaries and the convergence boundaries of the eye balls, arbitrary $M_R$ and $M_L$ can be expressed in terms of $\theta$ and $\mu$. Namely, by arbitrarily moving the left and right eyeballs through the ipsilateral binocular movement and the contralateral binocular movement, in the surface parallel direction, it is possible to pass through the evaluation point 22.

However, in the surface perpendicular direction, actually, the left and right eyeballs cannot rotate independently. Therefore, it seems that the eyeballs cannot rotate in accordance with the calculation method of the lines of fixations according to the present invention, at a glance. However, a motor fusion can become closer to a vertical fusion through a motion, and it is possible through a sense in the surface perpendicular direction in the Panum's area. A fusion in the surface vertical direction has a threshold value, but it is possible, if it is involuntary. Therefore, by the lines of fixation through the ray tracing method, a convergence aberration in the surface perpendicular direction does not contradict with the actual lines of fixations. However, if the vertical fusional vergence that is greater than or equal to the threshold value becomes the surface perpendicular component, then naturally, it cannot be realized. The calculation method by the lines of fixations with the ray tracing method in the present invention is a means to determine whether a rotational movement of an eyeball is possible or not.

In this embodiment, the above error in power, the residual astigmatism, and the convergence aberration are calculated as aberrations belonging to the evaluation point (usually every pitch of 1-10 degrees in the binocular vision direction in the whole lens surface, and there are some cases in which the lines of fixation exist only one of the left direction and the right direction, but the points are also reference points) of the object in the binocular vision direction in the Object-Eyeglass Lenses-Binocular Eyeballs System. From the calculated convergence aberration, the evaluation is performed in the following manner. Specifically, threshold values for enabling a sensory fusion and a motor fusion are provided, respectively, and the evaluation is performed based on whether it is within the range or not.

Here, an explanation is added with respect to a binocular function including a fusion which are focused in the present invention. Binocular functions are largely categorized into a simultaneous vision, a fusion, and a stereoscopic vision. For example, there are detailed explanations throughout non-patent document 3. In non-patent document 3, it is categorized in a structure such that the fusion is enabled when the simultaneous vision is enabled, and the stereoscopic vision is enabled when the fusion is enabled. In the present invention, the fusion is focused, and explanations of other functions are omitted. However, it is explicitly stated that without the fusion, the stereoscopic vision, which is the highest function of the binocular vision, is not realized. The fusion is a visual function which integrates pieces of visual information separately input to the respective eyes into one. It is the sensory fusion that integrate objects into one, without moving the eyeballs. A convergence, a divergence movement, and a vertical fusional vergence for obtaining the sensory fusion are called motor fusions. It is described, for example, in non-patent document 4 (David M. Hoffman, et al., "Vergence-accommodation conflicts hinder visual performance and cause visual fatigue," journal of vision, Vol. 8, No. 3, 33 (2008)), that the fusions are divided into motor fusions and sensory fusions.

In FIG. 2 on page 4 of non-patent document 4, convergence-accommodation linkage diagrams are separated into two groups of sensory ones and motive ones, and they are shown. These are shown in FIG. 18A and FIG. 18B. FIG. 18A shows the sensory fusions, the horizontal axis is a stimulus distance which shows size of a stimulus (unit: diopter D), and the vertical axis is a focal distance (D). FIG. 18B shows the motor fusions, the horizontal axis is a convergence distance (D), and the vertical axis is a focal distance (m). By referring to FIG. 18A, it can be understood that in the sensory fusions, the Panum's fusional area P and the focal depth are linked. By referring to FIG. 18B, it can be understood that in the motor fusions, the relative convergence and the relative accommodation are linked. By comparing FIG. 18A and FIG. 18B, it can be understood that the motor fusions are several times greater than the sensory fusions.

Further, a measurement method and a standard value regarding the motor fusion are described, for example, in non-patent document 5 (Written by Yukio Izumi, Toshinari Kazami, "Examination of Binocular Function," Revised Version, Waseda Optometry College (1985) p. 5).

A method of expressing an angle of convergence is explained. By setting a meter angle to MA, a minute of arc to $\theta$, a prism diopter to P, and a pupillary distance to PD (unit: mm), the following expressions shown in Expression 1-Expression 3 are satisfied. Here, a is a derived value of PD and MA.

$$a = \frac{PD \times MA}{2000} \quad \text{[Expression 1]}$$

$$\sin\left(\frac{\pi}{180} \times \frac{1}{60} \times \frac{\theta}{2}\right) = a \quad \text{[Expression 2]}$$

$$P = 100 \times \frac{2 \times a}{\sqrt{1-a^2}} \quad \text{[Expression 3]}$$

Reference examples of numerical computations are shown in FIG. 19A and FIG. 19B. In FIG. 19A, a pupillary distance is PD=0.06 m, and, in FIG. 19B, PD=0.065 m. In each of the numerical examples FIG. 19A and FIG. 19B, as parameters, a distance (cm), a meter angle MA, a minutes of arc (arc min), A (diopter) are listed.

Next, explanations are added regarding the sensory fusion and the motor fusion. The sensory fusion is a fusion in which there is no eyeball movement, and the motor fusion is a fusion with eyeball movements. These are different with each other. The sensory fusion is explained in accordance with p. 131-132 of non-patent document 6 (Edited by Keiji Uchikawa, Satoshi Shioiri, "Vision II," Asakura Publishing Co., Ltd. (2007), p. 131-132). In non-patent document 6, the following are described: "In order that two retinal images having binocular disparities are perceived as one, it is necessary that sizes of the disparities are within a certain range. This area is called the Panum's fusional area (or image fusion area), since Panum, for the first time, measured this area through systematic experiments. The fusional area depends on a stimulation condition (such as a spatiotemporal frequency, a position of a retina, existence or non-existence of a peripheral stimulus, a measurement method, or a criterion of determination), and it varies greatly, from a few minutes to a few degrees. Therefore, it cannot be represented by a specific result of an experiment."

Figure 20:
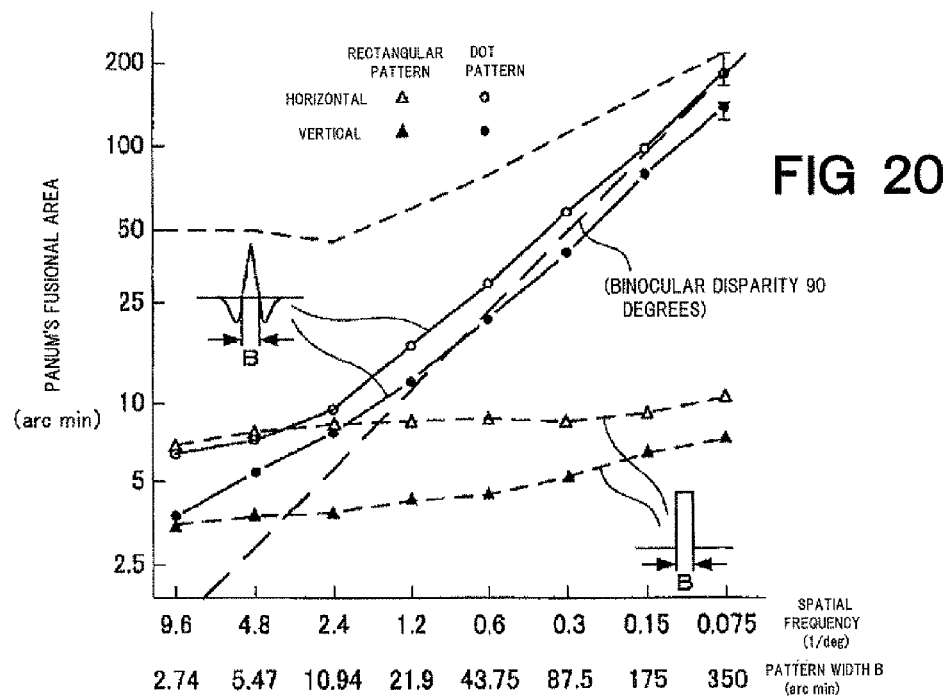
FIG. 20 is a diagram showing Panum's fusional area with respect to a special frequency of an object.

Here, a binocular disparity is a difference between lines of sights pinching nodal points of left and right eyeballs and a fixation point. For a simplified case, a nodal point and a center of rotation may not be distinguished, since the difference between the nodal point and the center of rotation are very small in comparison with a distance in the external world. Though it is in a specific experiment, but with respect to the range of the sensory fusion, it has been measured that it depends on a spatial frequency, that is, it depends on a shape or size of a visual object. The way how it depends is described, for example, in non-patent document 7 (Schor, C. Wood, I. Ogawa J. "Binocular sensory fusion is limited by spatial resolution," Vision Research, 24(7), (1984), p. 661-665). FIG. 20 shows the figure on page 584 of non-patent document 7. This figure is widely used, and it is described on page 316 of non-patent document 3. In FIG. 20, the horizontal axis shows a special frequency (that is, an inverse of a width of a pattern), and the vertical axis shows the Panum's fusional area. FIG. 20 compares a result for which an object is a rectangular pattern and a result for which an object is a random-dot pattern.

As shown in FIG. 20, in a state in which an eyesight is strong and the special frequency is high, the fusional area is relatively narrow and almost constant. Further, the fusional area differs in the horizontal direction and in the vertical direction, and there exists a spatial anisotropy. Where the spatial frequency is high, namely, viewing at a central fovea, the fusional area in the vertical direction is less than or equal to the fusional area in the horizontal direction. It is known that the Panum's fusional area differs depending on a presentation state of the object. It is widely known that, for example, the Panum's fusional area is wider for a rectangular pattern that appears in daily life than for a dotted pattern.

Figure 21:
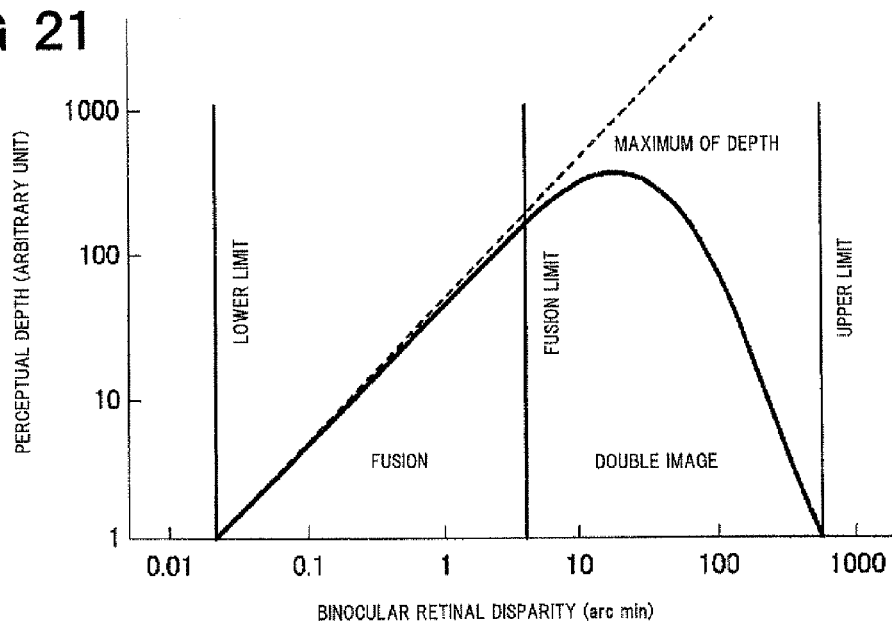
FIG. 21 is a diagram showing a relationship between a horizontal retinal image disparity and a perceived depth.
Figure 22:
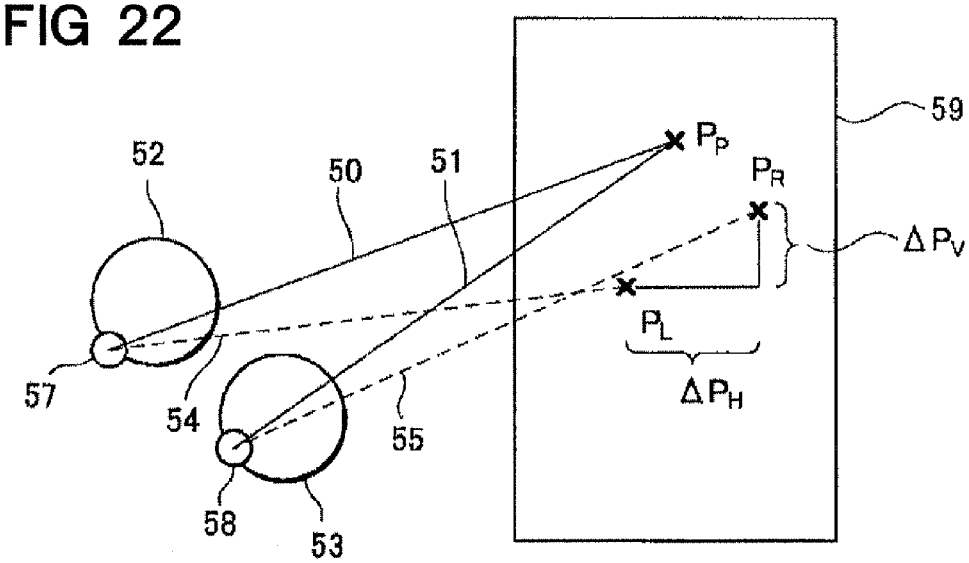
FIG. 22 is a diagram showing a disparity on an objective surface.
Figure 23:
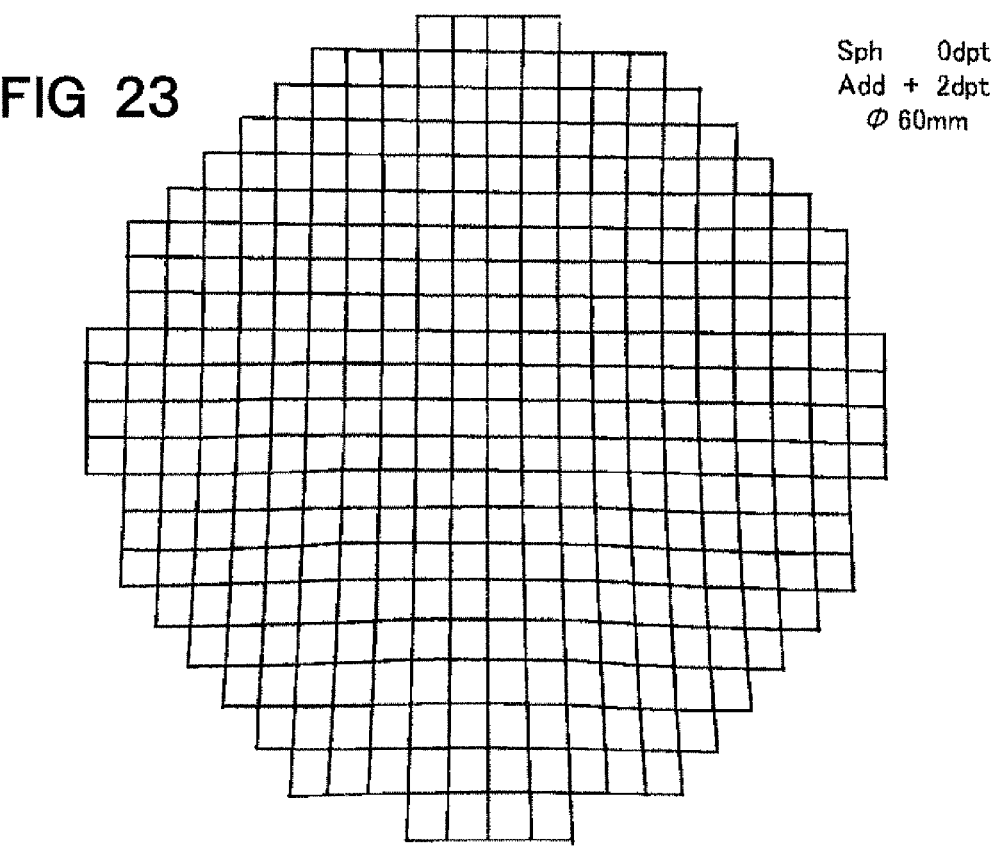
FIG. 23 is a diagram showing a distortion in a conventional technique.

As for an explanation of a range of disparity in the horizontal direction, a relationship between a horizontal retinal disparity and a perceptual depth is shown in FIG. 21 (page 86 of non-patent document 6). In FIG. 21, the horizontal axis shows a binocular retinal disparity that is a difference between disparities of both eyes in the horizontal direction, and the vertical axis shows a perceptual depth with respect to the binocular retinal disparity. According to FIG. 21, it can be understood that an amount of the depth increases in proportion to an increase in the binocular retinal disparity, but after passing through a fusion limit, they are no longer proportional, and after the depth reaching to its maximum, the depth decreases. In this manner, since the maximum of the depth and the fusion limit are different values, it can be said that a fusion and a stereoscopic vision are different physiological phenomena. There are individual differences in values of the maximum of the depth and the fusion limit, and they vary depending on a condition, such as a spatial frequency or a presenting time. Therefore, a binocular retinal disparity corresponding to a range from the fusion limit to the maximum of the depth can be approximately treated as "the Panum's fusional area."

There are documents which describe measurement values of the motor fusion and the sensory fusion, other than the above. Comprehensively judging from the disclosures of these documents, the sensory fusion is a fraction of the motor fusion. Here, these results are obtained mainly from psychological measurements.

(6) Explanation of a Fusion Threshold Value

It goes back to the explanation of steps for implementing the eyeglass lens evaluation method according to the present invention, from here. In the embodiment, it is determined whether the sensory fusion is possible or whether the motor fusion is possible, based on the value of the convergence aberration obtained by the above described step. As indices of a threshold value of the sensory fusion, the Panum's fusional area and a focal depths of eyeballs can be considered. However, as it has already been described, their quantitative measurements require precise and careful measurements, depending on a fusion stimulating condition. In addition, since their nature is such that they cannot be represented by a specific measurement, they are set without depending on a measurement. As a setting method, they can be arbitrarily selected from known measured values through designer's discretion, while a condition of use of the eyeglass lens is considered. Specifically, for the horizontal direction of the Panum's fusional area, a middle of an interval from the fusion limit of the binocular retinal disparity to the maximum of the depth is suitable. For the horizontal direction, judging from FIG. 21, a half of the binocular retinal disparity is suitable. Further, regarding the focal depth, the present applicant could not find any reliable measured value. Daringly describing numerical values, as a values derived from a horizontal retinal disparity of 15'-60', a diopter width of about 0.06-0.3 is suitable. Further, 4'-30' is suitable for the vertical retinal disparity. Namely, as the threshold value of the sensory fusion, it can be set to 0.06-0.3 diopter in the horizontal direction and 0.016-0.15 diopter in the vertical direction.

As it is clear from comparing the schematic diagram 18A of the sensory fusion with the schematic diagram 18B of the motor fusion, the threshold values of the motor fusion can be set to from twice to several times the threshold value of the sensory fusion. Further, for example, based on the measurement method of non-patent document 5, it is possible that a positive relative convergence, a negative relative convergence, and the vertical fusional vergence, that are known measured values, are individually measured, or calculated and derived according to age, etc., and the derived results are set to the threshold values of the motor fusion. For the motor fusion, for example, when the convergence aberration, at a time when the line of fixation moves, is within the threshold values of the positive relative convergence, the negative relative convergence, and the vertical fusional vergence, it means that a fusion condition is satisfied with respect to the convergence. Here, since its range is the fusion limit, there is a risk of fatigue near the threshold. Therefore, it is preferable that the threshold values of the motor fusion, in which it can be integrated with comfort, are set to the Persival's zones of comfort (within one third of a center of a range of a relative convergence, the relative convergence being the sum of the positive relative convergence and the negative relative convergence, and within 3 prism diopters for the angle of convergence). Further, for a simplified case, it is preferable that they are one third of the respective centers of the positive relative convergence and the negative relative convergence.

The same can be said for an average error in power. Namely, when the error in power is within a range of a positive relative accommodation and a negative relative accommodation, that are measured with the measurement method described in, such as non-patent document 5, it can be determined that the fusion is possible. The Persival's zones of comfort are valid for the error in power. Namely, the ranges of ⅓ are preferable. Namely, when the convergence aberration is within one third of the positive relative convergence and the negative relative convergence, and, when the average error in power is within one third of the positive relative accommodation and the negative relative accommodation, it can be said that a comfortable fusion, for which visual fatigue is less likely be occurred with respect to a binocular vision, is possible.

[2] Design Method and Manufacturing Method of Eyeglass Lenses

Next, an embodiment of a design method and a manufacturing method of eyeglass lenses according to the present invention are explained. The design method of eyeglass lenses according to the embodiment includes a step of performing an optimization calculation using the convergence aberration as a factor of an evaluation function.

Here, a lens shape design through a general optimization calculation, which is also used in the embodiment, is outlined. With respect to a lens shape and an object, in general, a surface is expressed with a general free form surface modeling, such as NURBS (Non-Uniform Rational B-Spline), or a known numerical expression. Further, a thickness and an arrangement are expressed in terms of suitable coefficients. At that time, the lens shape and the object are defined by the coefficients, which are components. In a first step, known parameters are input into a computer. The known parameters include the object, an arrangement relationship of Object-Lens-Eyeball, constrained conditions (for example, achieving a predetermined prescription value at a design reference point, the thickness does not become negative, etc.), the evaluation function for which an aberration of the lens is considered as a factor, etc. In a next step of the optimization calculation, a combination of the coefficients of the lens components, such that the evaluation functions obtained from the evaluation points on the object become less while the constrained conditions are satisfied, are found out. As a condition of convergence, converging calculations are repeated until the minimum value of the evaluation function or a combination of the coefficients for which the evaluation functions become substantially less cannot find out. When the condition of convergence is satisfied and the iterative calculation is terminated, the coefficients of the lens components are determined. The whole of the steps are called a lens shape determination or a lens design. In such a known optimization calculation, the lens design has an equivalent relationship with a known object, an arrangement relationship, constrained conditions, and evaluation functions. Namely, when the object, the arrangement relationship, the constrained conditions, and the evaluation functions are determined, the lens design is unambiguously determined.

Figure 9:
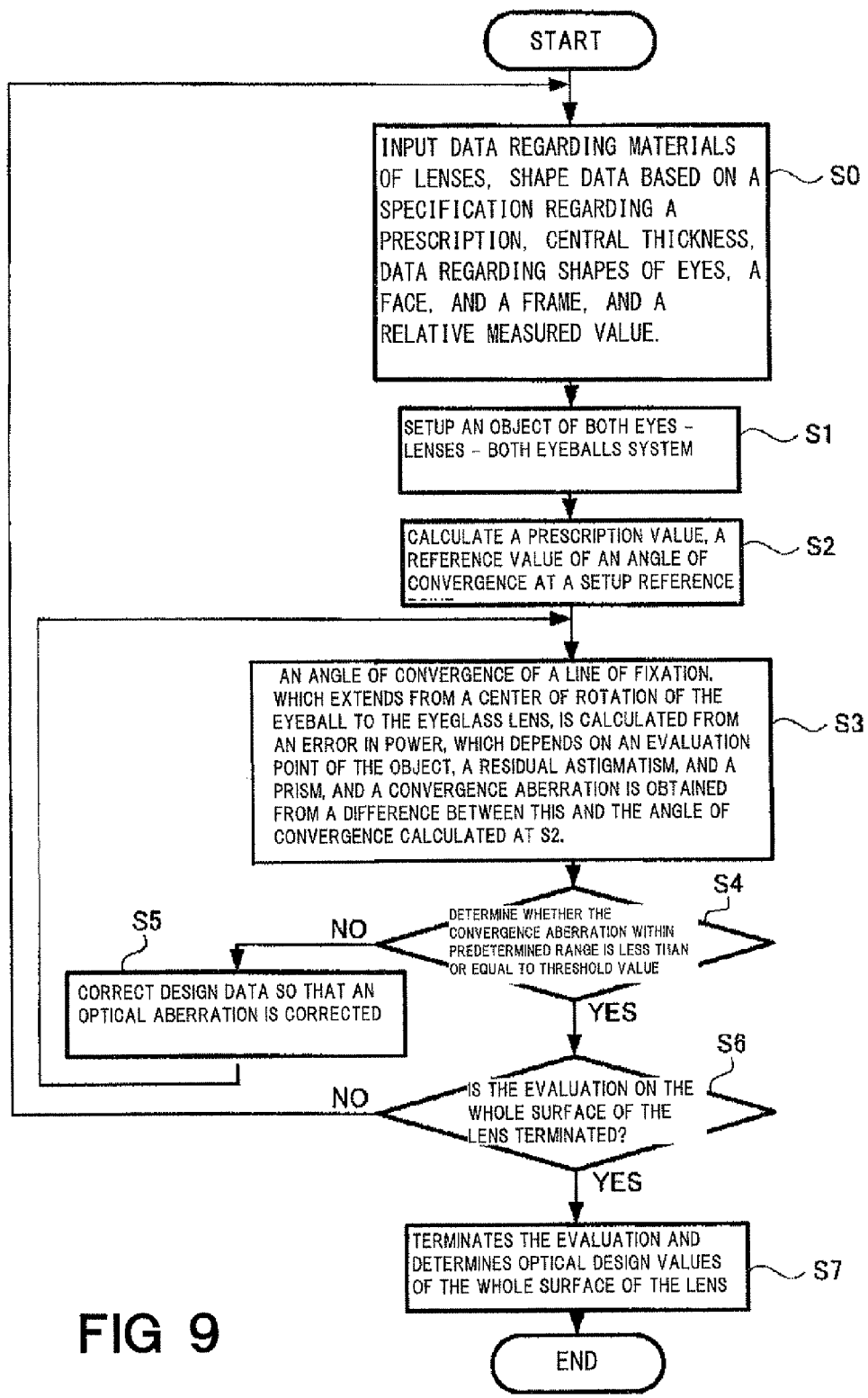
FIG. 9 is a diagram showing a flow chart according to an embodiment of an eyeglass lens design method of the present invention.

FIG. 9 is a flowchart for explaining the design method of eyeglass lenses according to the present invention. When a process of the design is started, firstly, data regarding materials of the lens, shape data which is based on a specification regarding a prescription, a central thickness, data regarding shapes of eyes, a face, and a frame, and depend on necessity, measured values of relative convergence, etc., setting values of fusion threshold values which are based on a designer's discretion are input (step S0). Details of the above described data are as follows.

a. data regarding materials of the lens
Specifically, it includes a 3-dimensional shape of the eyeglass lens, a refraction index, and an Abbe number, etc.

b. shape data which is based on a specification regarding a prescription
Prescribed powers such as S power, C power, an astigmatic angle, a prism power, a prism angle, a prescribed visibility distance.

C. central thickness
It is only input when the lens is a plus lens.

d. data regarding shapes of eyes, a face, and a frame
Specifically, it includes a lens frontal tilt angle, an elevation angle, PD (a distance between pupils of both eyes), VR (a distance between a center of rotation of an eyeball and a rear apex of the eyeglass lens), etc.

e. setting values of fusion threshold values
Threshold values of the motor fusion and threshold values of the sensory fusion, determined in accordance with an individual variation or a purpose, are calculated from individual measured values (for example, measured values of a relative convergence, a positive relative convergence, a negative relative convergence, a vertical fusional vergence), and are input. Or, threshold values selected by a designer in accordance with a purpose of a wearer of the eyeglass.

According to the design method of eyeglass lenses of this embodiment, next, the coordinate system in accordance with the Object-Eyeglass Lenses-Both Eye System is configured (step S1). Then, in this coordinate system, optical aberrations are calculated, based on the above described input data (step S2). Specifically, the average errors in power and the astigmatisms are minimized using the known ray tracing method, so that prescribed powers are attained at the design reference points, and at the same time, angles of convergence in the lines of fixations passing through the design reference points, that become reference convergence aberrations. The obtained angles of convergence are set to be the reference convergence aberration values.

According to the design method of eyeglass lenses of this embodiment, next, at each of the reference points of the eyeglass lenses, similarly, by using the ray tracing method, the average errors in power and the astigmatisms as well as the convergence aberrations, that are values obtained by subtracting the reference convergence aberration values, the reference convergence aberration values being obtained at the step S2, from the angles of convergences, are calculated (step S3).

According to the design method of eyeglass lenses of the embodiment, next, optimization calculations, such as the damped least squares methods, are performed so that calculated values of the evaluation functions, here, for example, the convergence aberration values, become minimum. Additionally, in this step, it is determined whether they are less than or equal to the above described threshold values. Further, the determination in this step can be performed not at the whole of the evaluation area, but within a predetermined area including the design reference points, for example, within a range of a radius of 3-5 mm. When it is determined that the values of the convergence aberrations are not less than nor equal to the threshold values at this step S4 (No at the step S4), the shape data is corrected so as to correct the optical aberrations (step S5). Here, for example, variable parameters of a refracting surface are corrected. When it is determined, at the step S4, that the values of the convergence aberrations are less than the threshold vales (Yes at the step S4), subsequently, it is determined whether the evaluations on the whole of the lens surfaces are terminated (step S6).

When it is determined, at the step S6, that the evaluations are not terminated on the hole of the lens surface and calculations for other reference points are remaining (No at the step S6), then the process goes back to the step S3, and optical performance values at other points of the lenses are input. When it is determined that the evaluations at all the predetermined evaluation points are terminated (Yes at the step S6), the evaluations are terminated and design values on the whole of the lens surface are determined (step S7).

With the above steps, the design method of eyeglass lenses according to the embodiment is terminated. Here, the information input at the step S1 is not limited to the above described information, and it is possible to input other information and to add the other information for the calculations of the evaluation functions. Further, the eyeglass lenses are manufactured through processing lenses based on the determined optical design values. At this time, shape parameters, such as manufacturer's original shape parameters or correction coefficients determined at a factory (manufacturing equipment), can be added.

And, after that, by processing the back surfaces of the surfaces of the lenses based on the determined optical design values, the eyeglass lenses can be produced.

[3] Eyeglass Lens Manufacturing System

Figure 10:
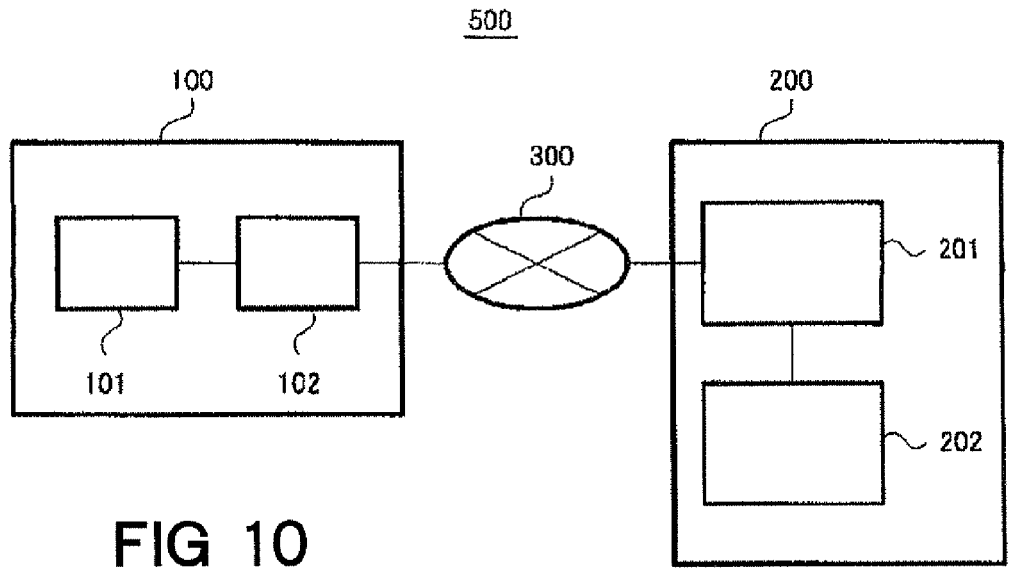
FIG. 10 is a schematic configuration diagram of a manufacturing system according to an embodiment of an eyeglass lens manufacturing method of the present invention.

Next, an embodiment of an eyeglass lens manufacturing system which realizes the eyeglass lens manufacturing method according to the present invention is explained. FIG. 10 is a schematic diagram of the eyeglass lens manufacturing system. As shown in FIG. 10, in the system 500, at the side of an eyeglass shop 100, there are a measurement device 101 which measures the eyesight and the relative convergence, or the positive relative convergence and the negative relative convergence of a customer who has ordered the eyeglass lenses, and an ordering side computer 102 which includes a function for inputting various information including the values measured with the measurement device and for processing necessary processes for ordering the eyeglass lenses. Here, when the measurement values regarding the convergence, such as the relative convergence, are not input, data regarding a fusion, which depends on the customer's selection, may be input. Further, data, such as an age or a purpose, for selecting the threshold values of the fusion at the side of the lens manufacturer, may be input.

On the other hand, at an order receiving side, for example, in a lens manufacturer 200, a manufacturing side computer 201, which is connected to a communication line 300 such as the Internet, is provided, in order to receive the information output from the ordering side computer 102. The manufacturing side computer 201 has a function to perform necessary processes for receiving the order of the eyeglass lenses, and, at the same time, has a function to implement the eyeglass lens design method, such as the method explained in FIG. 9. Namely, the information necessary for designing the eyeglass lenses, which has been ordered from the ordering side computer 102, includes the relative convergence and data used for selecting the threshold values for the convergence. Then, the manufacturing side computer 201 performs an optimization calculation regarding the convergence aberration using the Object-Eyeglass Lens-Eyeball System, which has been set using the present invention, and determines the optical design values, and concurrently, outputs manufacturing information for manufacturing the eyeglass lenses based on the optical design values to a lens processing device 202.

Further, the information input to the manufacturing side computer 201 is not limited to the information which has been shown in the step S0 of FIG. 9 as described above, and it is possible to input other information and add the other information to the calculation of the evaluation function. Also, the eyeglass lenses are produced through processing the lenses based on the determined optical design values, and at this time, shape parameters, such as the manufacturer's own shape parameters or the correction coefficients determined at the factory (manufacturing equipment), may be added.

Figure 11:
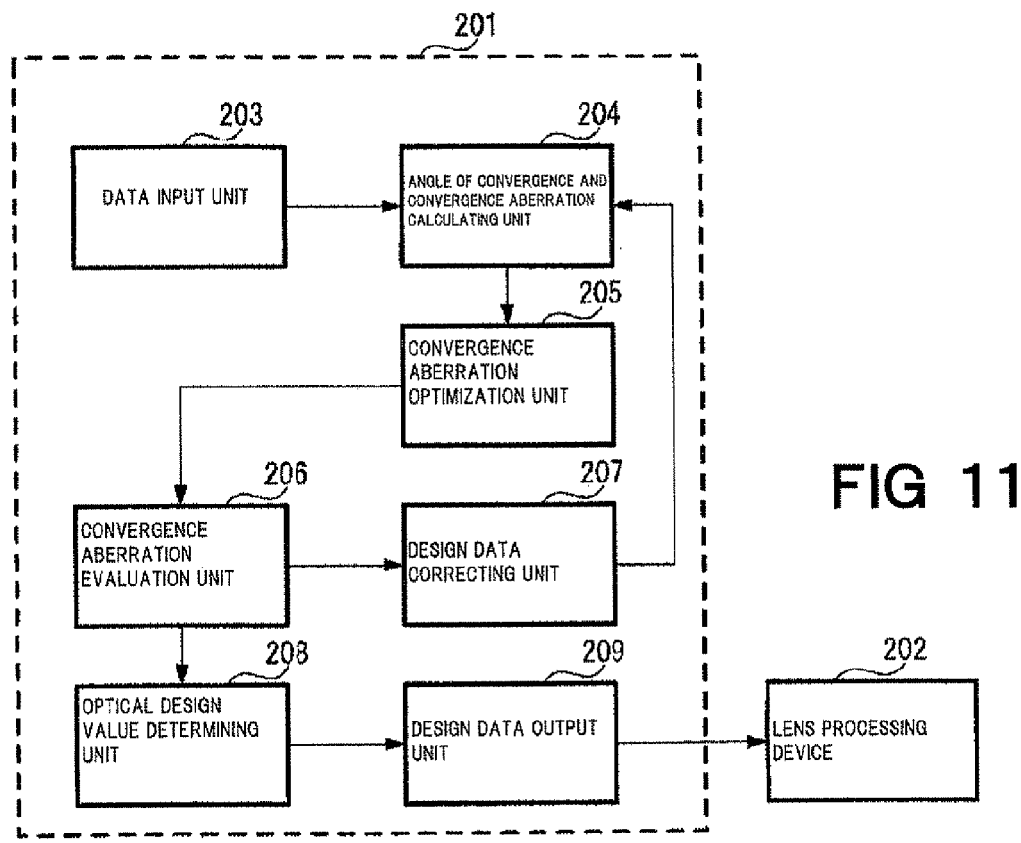
FIG. 11 is a functional block diagram of a manufacturing-side computer in the manufacturing system according to the embodiment of an eyeglass lens manufacturing method of the present invention.

FIG. 11 is a functional block diagram for explaining the function of the manufacturing side computer 201 according to the embodiment, the manufacturing side computer 201 being the core of the eyeglass lens manufacturing system. As shown in FIG. 11, the manufacturing side computer 201 includes a data input unit 203 for inputting various types of data transmitted from the ordering side computer 102, an angle of convergence and convergence aberration calculating unit 204 for calculating the reference values of the angle of convergence or the convergence aberrations based on the input data, a convergence aberration optimization unit 205 for calculating optimization of the evaluation functions including the convergence aberrations as a factor, and a convergence aberration evaluation unit 206 for comparing the values of the convergence aberrations with the predetermined threshold values. The manufacturing side computer 201 further includes a design data correcting unit 207 for correcting the design data, for example, the lens shape data, when it is necessary to correct the optical performance as a result of the evaluation at the convergence aberration evaluation unit 206, an optical design value determining unit 208 for determining optical design values, when the evaluation at each of the evaluation points are terminated, and a design data output unit 209 for outputting the design data based on the optical design values to the lens processing device 202.

The measurement device 101 at the eyeglass shop 100 shown in FIG. 10 inputs the eyesight of the customer who has ordered the eyeglass lenses and the measurement values of the relative convergence etc., as well as information on the customer, who has ordered the eyeglass, which can be used for setting the threshold values of the convergence, and adds a predetermined process at the ordering side computer 102 and transmits to the lens manufacturer 200 through the communication line 300. The computer 201 (manufacturing side computer) at the lens manufacturer 200 inputs shape data, which is based on data regarding materials of the lens or a specification, and data regarding the eyes, the face, and the shape of the frame, which has been received at the data input unit 203, and at the same time, inputs data, such as data necessary for setting the threshold values of the convergence.

Then, the angle of convergence and convergence aberration calculating unit 204 calculates the convergence aberrations from the reference convergence aberration values and the angles of convergence at the evaluation points, based on the input data (prescription values). The convergence aberration optimization unit 205 obtains necessary optical performance values such as the astigmatisms at the respective evaluation points of the eyeglass lenses by setting the calculated convergence aberrations as the evaluation functions, and calculates the optimized optical performance values at the respective evaluation points, from the evaluation functions. The optimization calculation is performed through the damped least squares method, etc.

Next, the convergence aberration evaluation unit 206 compares the values of the convergence aberrations calculated by the angle of convergence and convergence aberration calculating unit 204 with the preset threshold values. Based on the comparison result of the convergence aberration evaluation unit 206, namely, when the values of convergence aberrations do not reach to the preset values, the design data correcting unit 207 corrects the design data of the eyeglass lenses, so that the convergence aberrations are within a desired range of the fusion. The optical design value determining unit 208 determines the optical design values at respective evaluation points. And, when the evaluations at the all the preset evaluation points are terminated, the determined optical design values for the whole of the lens surfaces are transmitted from the design data output unit 209 to the lens processing device 202, which is shown in FIG. 10.

As the lens processing device 202, an ordinary eyeglass lens manufacturing device, which applies, for example, a cutting and polishing process to a lens, based on input data of curvatures of a front surface or a rear surface of the lens, or curvatures of the both surfaces, is used. Since the lens processing device 202 is a known device as an eyeglass lens manufacturing device, a concrete explanation of the device is omitted.

[4] Embodiment of the Eyeglass Lens Evaluation Method

Next, the results of performing evaluations using the convergence aberrations of binocular visions of various eyeglass lenses, for which the eyeglass lens evaluation method according to the embodiment of the present invention described above is used, are explained.

(1) Embodiment 1

An Example of an Astigmatism Degree 0 D

Figure 12:
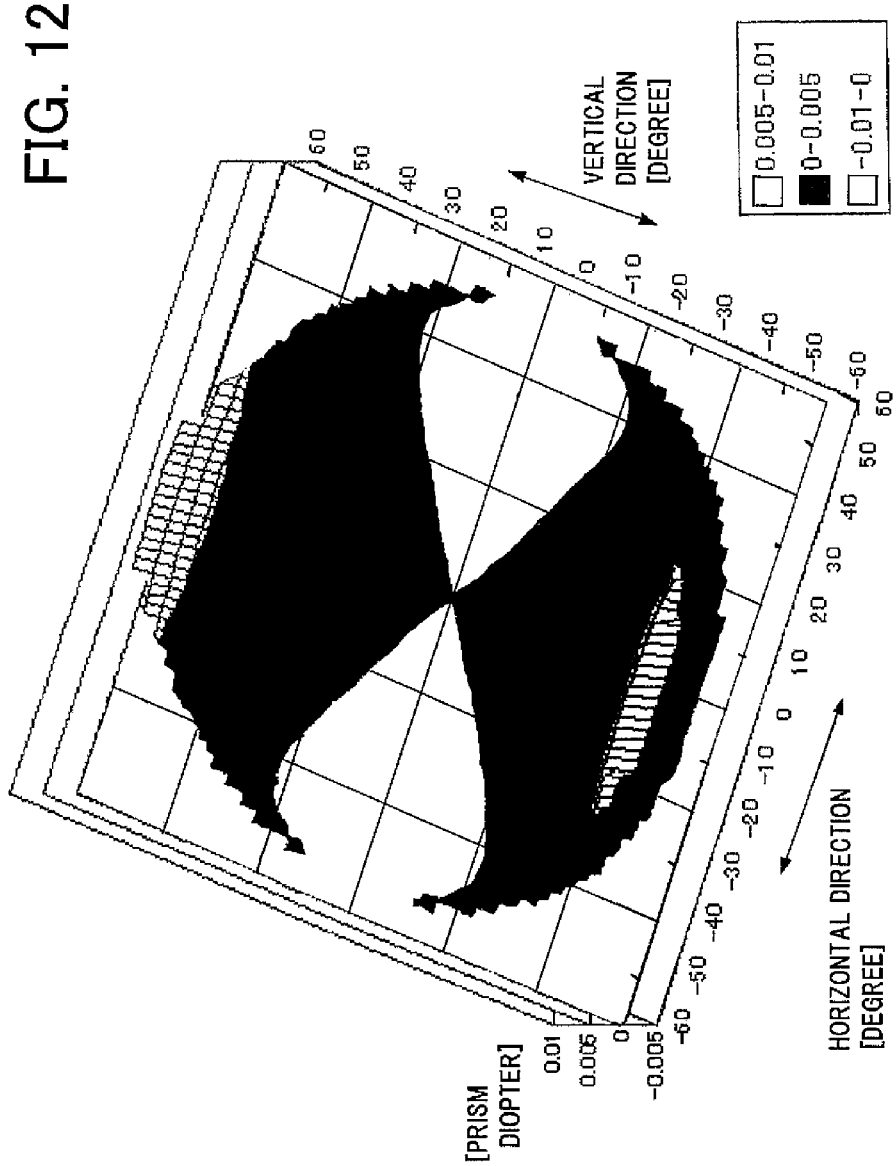
FIG. 12 is a diagram showing a surface parallel component of a convergence aberration of a first embodiment in the eyeglass lens evaluation method of the present invention.
Figure 13:
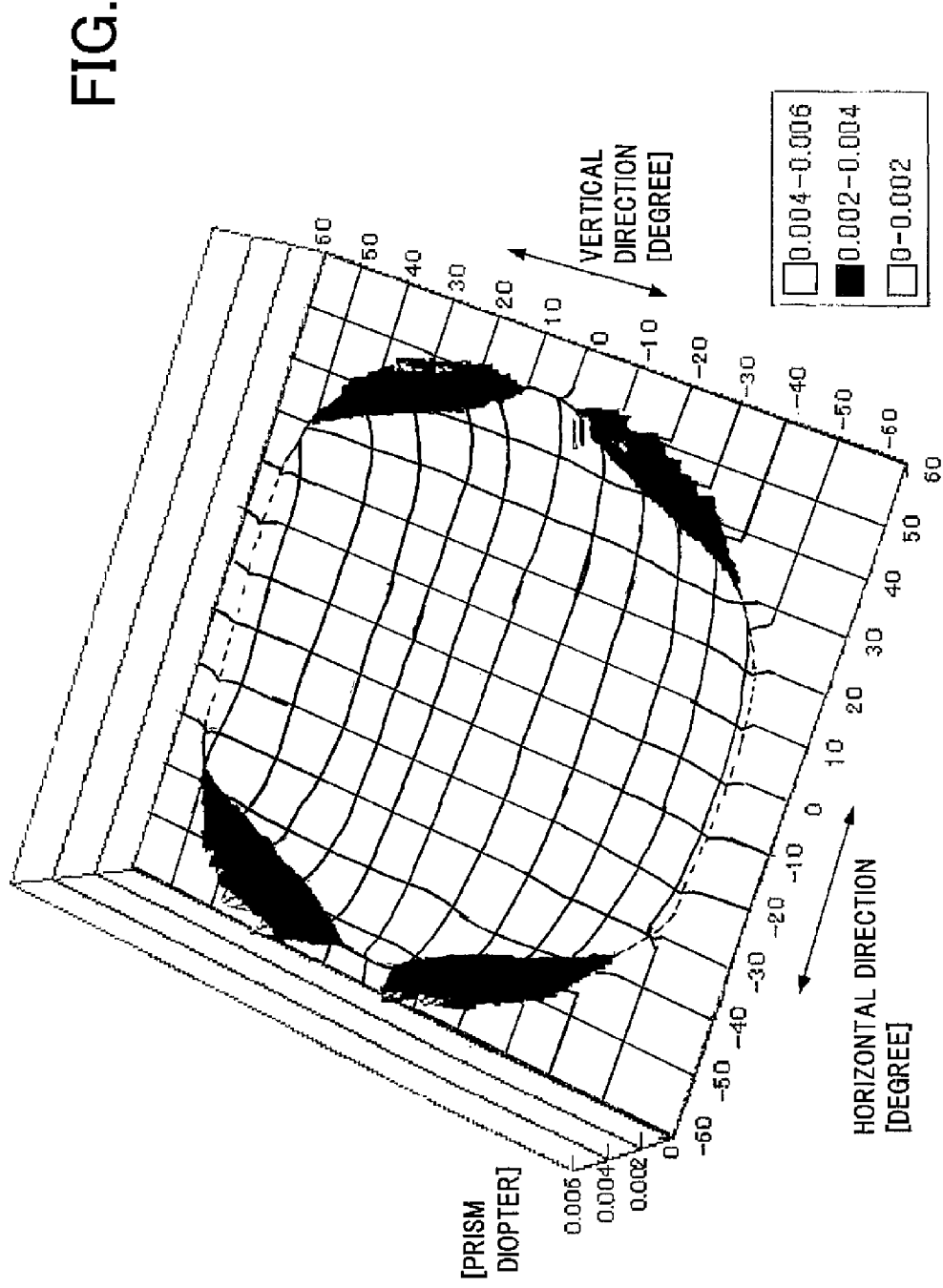
FIG. 13 is a diagram showing a surface perpendicular component of the convergence aberration of the first embodiment in the eyeglass lens evaluation method of the present invention.

As embodiment 1, an example of calculations of the convergence aberrations for a case in which both of left and right eyeglass lenses have the spherical diopter power of 4 D and the astigmatism degree of 0 D is considered. The results are shown in FIG. 12 and FIG. 13. This example is an example of an evaluation for a single focus eyeglass lenses, and no iteration calculation is performed for optimization. An object is set to a hemisphere surface of an infinite radius which is centered by the origin 1 in a viewing direction, in the coordinate system explained in the above described embodiment. Namely, the evaluation is performed for far view. The eyeglass lens is a general-purpose bilateral aspheric lens, and it is successfully corrected by a visual acuity function described in WO2002/088828, WO2004/018988, or in the specification of PCT/JP2008/069791 regarding the application of the present applicant. In this example, in order to clarify the effect of the evaluation method of the present invention, a front tilt angle, an elevation angle, and an eccentricity of the lens are set to 0. The distance from the apex of a cornea to the center of rotation of the eyeball is 27.7 mm, the Abbe number is set to 32, the lens radius is set to 75 mm, and the pupillary distance is set to 62 mm. The two pieces consist of FIG. 12 and FIG. 13 are one set, and they diagrammatically show the evaluations at the respective evaluation points of the eyeglass lens. Namely, both the horizontal axis and the vertical axis are binocular directions, the horizontal axis is the horizontal direction, the vertical axis is the vertical direction, and the unit is a degree of the angles. FIG. 12 shows the convergence aberrations in the surface parallel direction, FIG. 13 shows the convergence aberrations in the surface vertical direction, and the unit in both is a prism diopter. As shown in FIG. 12 and FIG. 13, both the surface parallel components and the surface perpendicular components of the convergence aberrations are extremely small, and they are less than or equal to 0.005 prism diopter, in almost all the areas. Namely, the fusion is successfully performed, and the performance of the binocular vision is high. Further, it can be considered that the convergence aberrations are expressed not only in the scalar notation but also in the vector notation. This also is within the scope of the present invention.

(2) Embodiment 2

Figure 14:
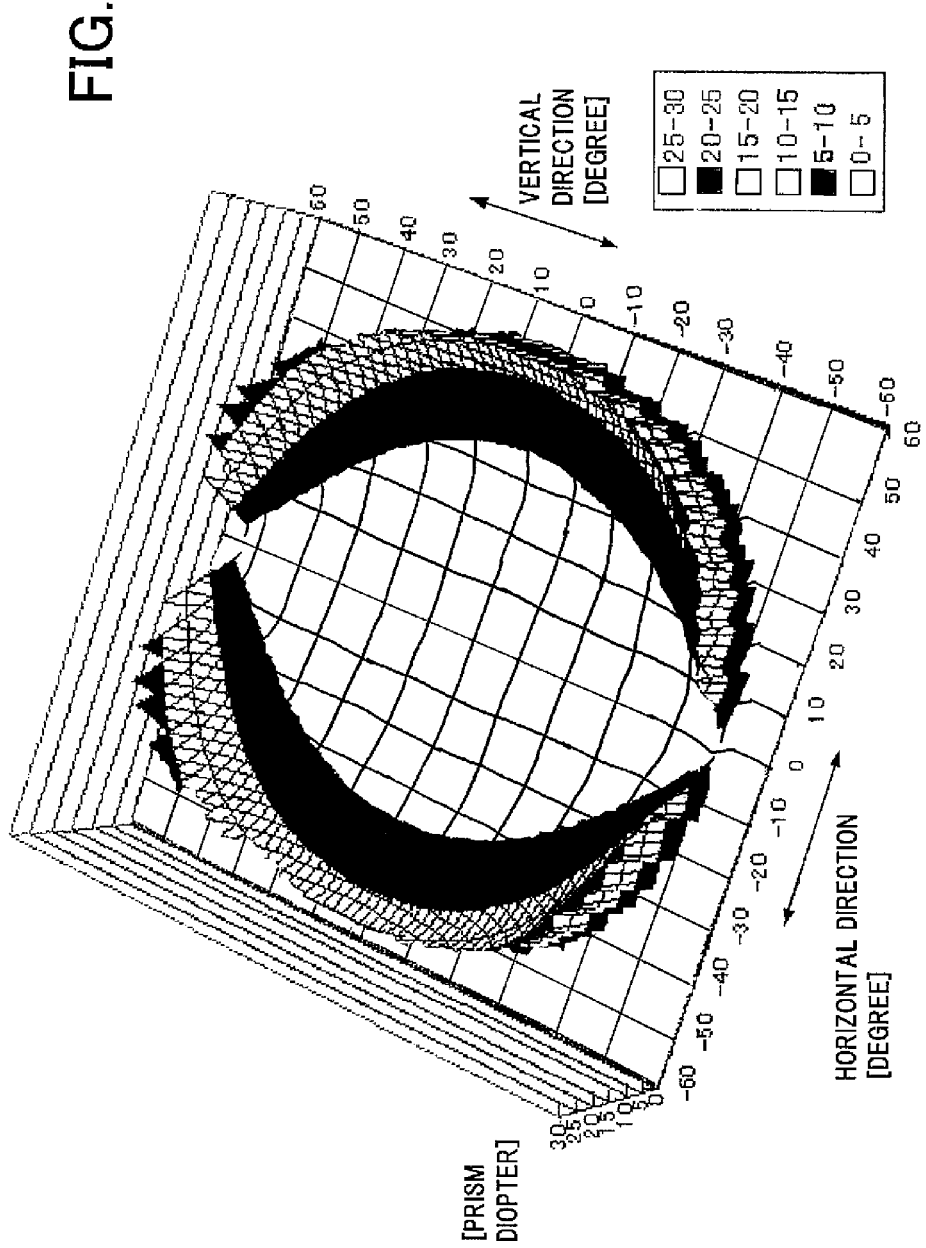
FIG. 14 is a diagram showing a surface parallel component of a convergence aberration of a second embodiment in the eyeglass lens evaluation method of the present invention.
Figure 15:
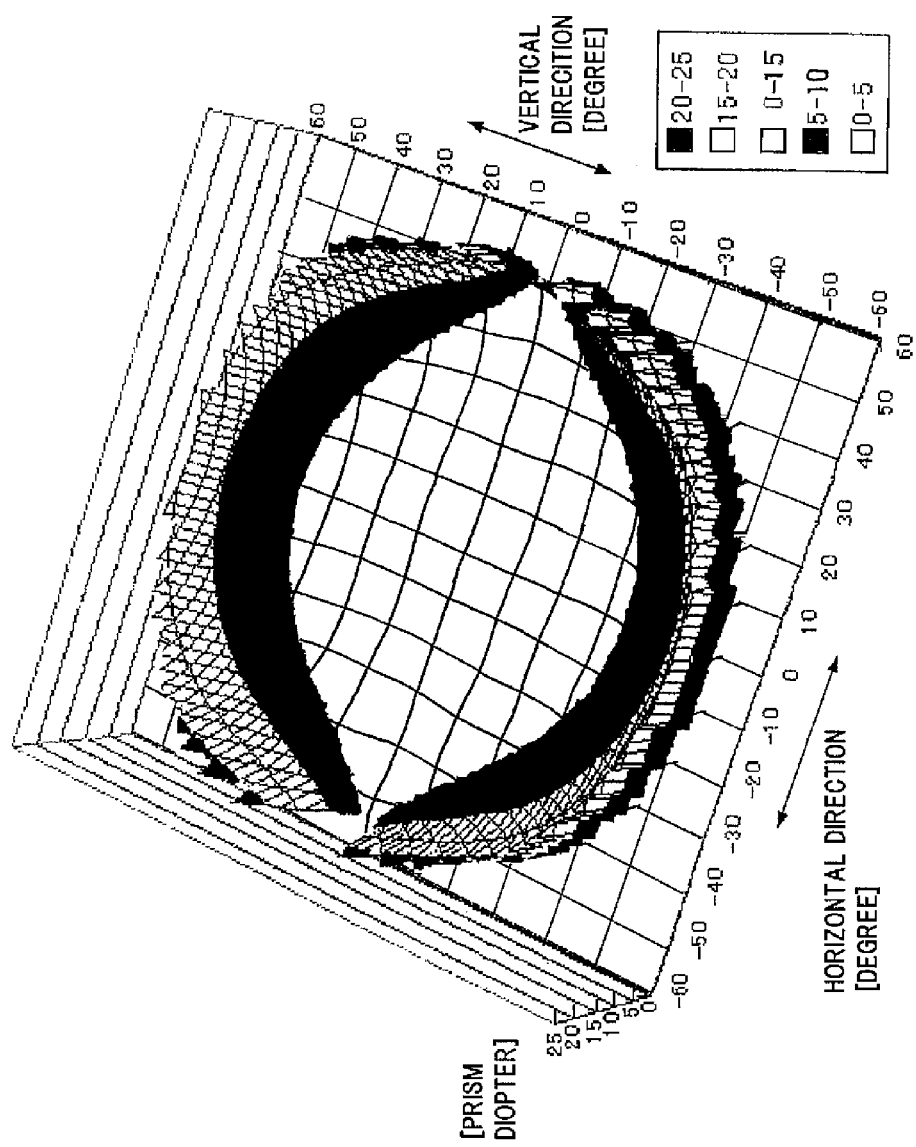
FIG. 15 is a diagram showing a surface perpendicular component of the convergence aberration of the second embodiment in the eyeglass lens evaluation method of the present invention.

An Example in which a Difference Between Left and Right Spherical Diopter Powers are Greater than or Equal to −2 D Next, as embodiment 2, an evaluation of eyeglass lenses, which is in general regarded as the definition of an anisometropia (greater than or equal to −2 D, in left and right), is performed. In this example, the spherical diopter power of the right eyeglass lens is set to −4 D, the astigmatism degree is set to 0 D, that is the same as the lens used in the above described embodiment 1. On the other hand, for the left eyeglass lens, the spherical diopter power is set to −6 D, the astigmatism degree is set to 0 D, and other conditions are set to the same as the above described embodiment 1. This example is also an example of an evaluation of eyeglass lenses, and no iteration calculation is performed for optimization. The results of the calculations of the convergence aberrations are shown in FIG. 14 and FIG. 15. FIG. 14 shows the surface parallel component of the convergence aberrations, and FIG. 15 shows the surface perpendicular component of the convergence aberrations. Both the surface parallel component and the surface perpendicular component are very large, and in general, in the eyeglass lenses for an anisometropia, the convergence aberrations are large from the center of the lens toward the radial direction. As shown in FIG. 14 and FIG. 15, the convergence aberrations are greater than 5 prism diopters, and the area of the sensory fusion is narrow. Namely, when this eyeglass lenses are worn, the fusion is performed through the motor fusion. Therefore, it is considered that there is no rest for the rotational movement of the eyeballs. When a visual fatigue occurs, it can be considered that it is the one of the causes.

3) Embodiment 3

An Example in which an Elevation Angle is 20 Degrees

Figure 16:
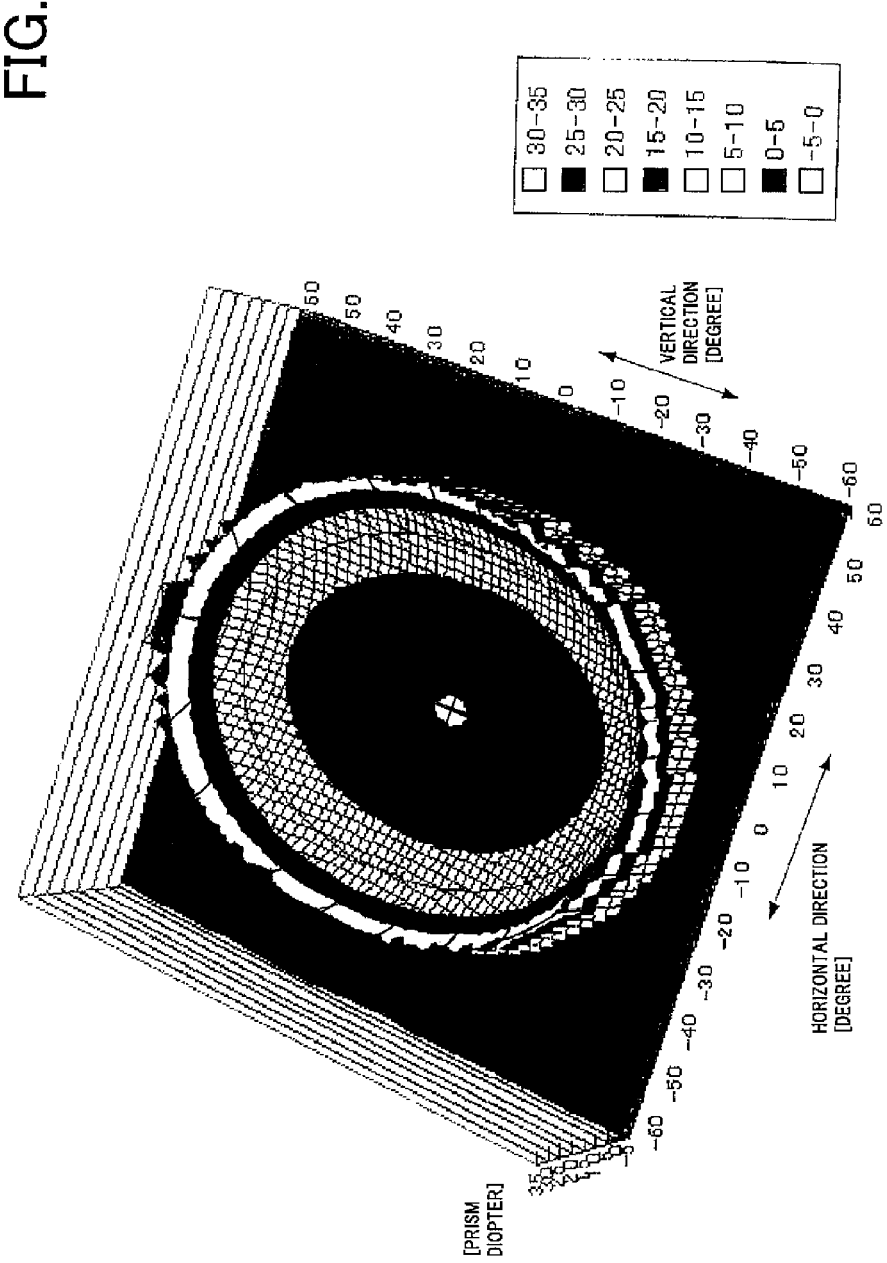
FIG. 16 is a diagram showing a surface parallel component of a convergence aberration of a third embodiment in the eyeglass lens evaluation method of the present invention.
Figure 17:
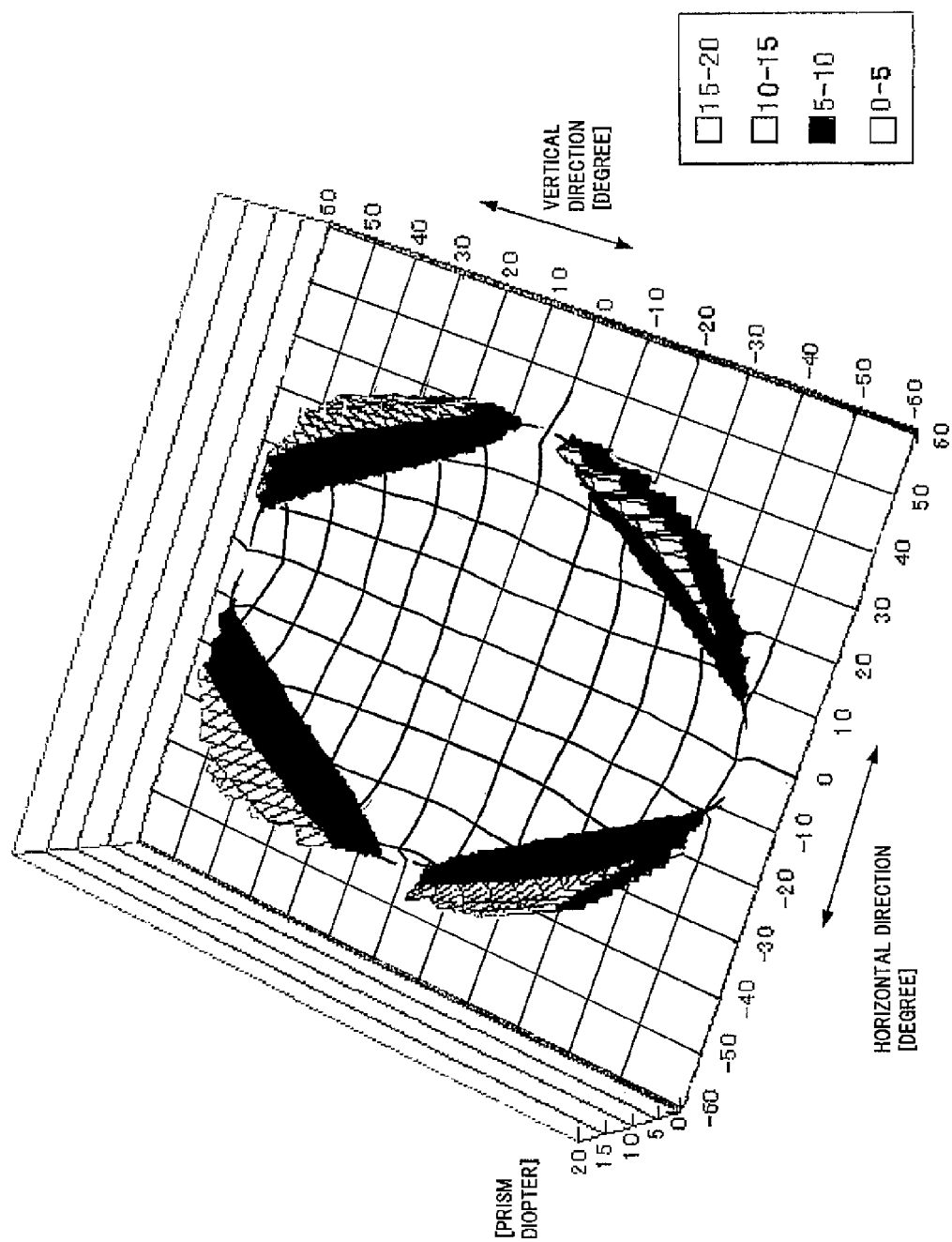
FIG. 17 is a diagram showing a surface perpendicular component of the convergence aberration of the third embodiment in the eyeglass lens evaluation method of the present invention.

Next, as embodiment 3, the convergence aberrations are calculated for the case in which there is an elevation angle in a frame. The results are shown in FIG. 16 and FIG. 17. In embodiment 3, the spherical diopter power and the astigmatism degree are set to the same as that of the lens used in the above embodiment 1, and in order to evaluate the extent of the effect of the elevation angle, this example is set as an example in which the elevation angle of 20 degrees is given. The rest of the conditions are the same as that of the above described embodiment 1. FIG. 16 shows the surface parallel component of the convergence aberrations, and FIG. 17 shows the surface vertical component of the convergence aberrations. Embodiment 3 is also an example of an evaluation of eyeglass lenses, and no iteration calculation is performed for optimization. In embodiment 3, it is a characteristic that, among the convergence aberrations, the surface parallel component shown in FIG. 16 is very large, in comparison with the surface perpendicular component shown in FIG. 17. Further, if it is compared with embodiment 2, deterioration in the surface parallel component is large, and it becomes clear that the eyeglass lens with the elevation angle of 20 degrees gives a larger impact on the binocular vision than the eyeglass lens for an anisometropia (difference in degree 2 D).

From the above, it can be seen that it becomes possible to quantitatively evaluate a binocular vision of eyeglass lenses using the convergence aberrations, with the eyeglass lens evaluation method according to the embodiment of the present invention. Additionally, though an example of a calculation is omitted, it is possible to broaden a fusion enabling area of a binocular vision, by optimizing while using the convergence aberrations as a factor of evaluation functions. Namely, it is possible to improve a performance of a binocular vision. Furthermore, the present invention is not limited by the configurations explained in the above described embodiments, and various modifications and changes are possible in the range that does not departing from the invention configuration, such as setting the object at a place other than a place on a hemisphere.

What is claimed is:

1. A method of evaluating eyeglass lenses comprising:
   setting an optical system including an object, left and right eyeglass lenses and both eyeballs, wherein the object is specified by a visual direction from a midpoint of rotations of both of the eyeballs;
   calculating a reference value of an angle of convergence with lines of fixation for which a fixation point of the object is set as a viewing direction, the fixation point being an intersection point at which the lines of fixation cross with each other after passing through design reference points of the left and right eyeglass lenses;
   calculating an angle of convergence with the lines of fixation, the lines of fixation extending to an object evaluation point in an arbitrary viewing angle and passing through the left and right eyeglass lenses;
   calculating a convergence aberration from a difference between the angle of convergence and the reference value of the angle of convergence; and
   evaluating the eyeglass lenses using the convergence aberration.

2. The method of evaluating eyeglass lenses according to claim 1,
   wherein, when the eyeglass lenses are single focus eyeglass lenses, the object is set at a position on a hemisphere, a center of the hemisphere being at the origin, and a radius of the hemisphere being a distance between an intersection point of the lines of fixation and the origin, the lines of fixation being from centers of rotations of left and right eyeballs and passing through left and right design reference points, respectively.

3. The method of evaluating eyeglass lenses according to claim 1,
   wherein, when the eyeglass lenses are progressive power lenses, the object is set at a position on a hemisphere, a center of the hemisphere being at the origin, and a radius of the hemisphere being a distance between an intersection point of the lines of fixation and the origin, the lines of fixation being from centers of rotations of left and right eyeballs and passing through design reference points of far vision portions, respectively.

4. The method of evaluating eyeglass lenses according to claim 1,
   wherein, for a value of the convergence aberration, the evaluation is performed with at least one of threshold values of a sensory fusion and threshold values of a motor fusion.

5. An eyeglass lens design method comprising:
   setting an optical system including an object, left and right eyeglass lenses and both eyeballs, wherein the object is specified by a visual direction from a midpoint of rotations of both of the eyeballs;
   calculating a reference value of an angle of convergence with lines of fixation for which a fixation point of the object is set as a viewing direction, the fixation point being an intersection point at which the lines of fixation cross with each other after passing through design reference points of the left and right eyeglass lenses;
   calculating an angle of convergence with the lines of fixation, the lines of fixation extending to an object evaluation point in an arbitrary viewing angle and passing through the left and right eyeglass lenses, and calculating a convergence aberration from a difference between the angle of convergence and the reference value of the angle of convergence; and
   determining a lens shape by performing an optimization so that a value of the convergence aberration is within predetermined threshold values,
   wherein a fusion is possible within the predetermined threshold values.

6. An eyeglass lens manufacturing method comprising, for a value of a convergence aberration obtained through:
   setting an optical system including an object, left and right eyeglass lenses and both eyeballs, wherein the object is specified by a visual direction from a midpoint of rotations of both of the eyeballs;
   calculating a reference value of an angle of convergence with lines of fixation for which a fixation point of the object is set as a viewing direction, the fixation point being an intersection point at which the lines of fixation cross with each other after passing through design reference points of the left and right eyeglass lenses; and
   calculating an angle of convergence with the lines of fixation, the lines of fixation extending to an object evaluation point in an arbitrary viewing angle and passing through the left and right eyeglass lenses, and calculating the convergence aberration from a difference between the angle of convergence and the reference value of the angle of convergence;
   designing a lens shape by performing an optimization so that the value of the convergence aberration is within predetermined threshold values, wherein a fusion is possible within the predetermined threshold values; and
   a process of manufacturing an eyeglass lens based on determined design values for the lens shape.

7. An eyeglass lens manufacturing system comprising:
   a designing means for designing a lens shape by performing an optimization so that a value of a convergence aberration is within predetermined threshold values;
   wherein a fusion is possible within the predetermined threshold values; and
   wherein the value of the convergence aberration is obtained through:
      setting an optical system including an object, left and right eyeglass lenses and both eyeballs, wherein the object is specified by a visual direction from a midpoint of rotations of both of the eyeballs;
      calculating a reference value of an angle of convergence with lines of fixation for which a fixation point of the object is set as a viewing direction, the fixation point being an intersection point at which the lines of fixation cross with each other after passing through design reference points of the left and right eyeglass lenses; and
      calculating an angle of convergence with the lines of fixation, the lines of fixation extending to an object evaluation point in an arbitrary viewing angle and passing through the left and right eyeglass lenses, and calculating the convergence aberration from a difference between the angle of convergence and the reference value of the angle of convergence; and a manufacturing means for manufacturing an eyeglass lens based on determined design values for the lens shape.

8. An eyeglass lens manufacturing system comprising:

a designing unit configured to design a lens shape by performing an optimization so that a value of a convergence aberration is within predetermined threshold values;

wherein a fusion is possible within the predetermined threshold values; and wherein the value of the convergence aberration is obtained through:
- setting an optical system including an object, left and right eyeglass lenses and both eyeballs, wherein the object is specified by a visual direction from a midpoint of rotations of both of the eyeballs;
- calculating a reference value of an angle of convergence with lines of fixation for which a fixation point of the object is set as a viewing direction, the fixation point being an intersection point at which the lines of fixation cross with each other after passing through design reference points of the left and right eyeglass lenses; and
- calculating an angle of convergence with the lines of fixation, the lines of fixation extending to an object evaluation point in an arbitrary viewing angle and passing through the left and right eyeglass lenses, and calculating the convergence aberration from a difference between the angle of convergence and the reference value of the angle of convergence; and a manufacturing unit configured to manufacture an eyeglass lens based on determined design values for the lens shape.

9. The method of evaluating eyeglass lenses according to claim 1, wherein the optical system is defined by a coordinate system whose origin is placed at the midpoint of centers of rotations of both of the eyeballs.

10. The eyeglass lens design method according to claim 5, wherein the optical system is defined by a coordinate system whose origin is placed at the midpoint of centers of rotations of both of the eyeballs.

11. The eyeglass lens manufacturing method according to claim 6, wherein the optical system is defined by a coordinate system whose origin is placed at the midpoint of centers of rotations of both of the eyeballs.

12. The eyeglass lens manufacturing system according to claim 7, wherein the optical system is defined by a coordinate system whose origin is placed at the midpoint of centers of rotations of both of the eyeballs.

13. The eyeglass lens manufacturing system according to claim 8, wherein the optical system is defined by a coordinate system whose origin is placed at the midpoint of centers of rotations of both of the eyeballs.

\* \* \* \* \*